(12) United States Patent
Gu et al.

(10) Patent No.: US 9,999,030 B2
(45) Date of Patent: Jun. 12, 2018

(54) RESOURCE PROVISIONING METHOD

(71) Applicant: Huawei Technologies Co., Ltd., Shenzhen (CN)

(72) Inventors: Jiongjiong Gu, Shenzhen (CN); Chaoyi Huang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 60 days.

(21) Appl. No.: 14/812,872

(22) Filed: Jul. 29, 2015

(65) Prior Publication Data

US 2015/0334696 A1    Nov. 19, 2015

Related U.S. Application Data

(63) Continuation of application No. PCT/CN2014/081352, filed on Jul. 1, 2014.

(30) Foreign Application Priority Data

Aug. 15, 2013    (WO) ................ PCT/CN2013/081514

(51) Int. Cl.
  *H04W 72/04*    (2009.01)
  *H04W 56/00*    (2009.01)
  (Continued)

(52) U.S. Cl.
  CPC .... *H04W 72/0406* (2013.01); *G06F 9/45558* (2013.01); *H04L 12/66* (2013.01);
  (Continued)

(58) Field of Classification Search
  CPC ......... G06F 9/45558; G06F 2009/4557; G06F 2009/45595; H04W 72/0406;
  (Continued)

(56) References Cited

U.S. PATENT DOCUMENTS

2011/0179162 A1    7/2011    Mayo et al.
2011/0246627 A1    10/2011    Kern
(Continued)

FOREIGN PATENT DOCUMENTS

CN    102185928 A    9/2011
CN    102315968 A    1/2012
(Continued)

OTHER PUBLICATIONS

Gan, "Virtual cluster application in network management center," Computer Knowledge and Technology, vol. 8, No. 27, China Academic Journal Electronic Publishing House (Sep. 2012).
(Continued)

*Primary Examiner* — Lewis A Bullock, Jr.
*Assistant Examiner* — Jacob D Dascomb
(74) *Attorney, Agent, or Firm* — Leydig, Voit & Mayer, Ltd.

(57) ABSTRACT

Embodiments of the present invention provides a resource provisioning method, including: receiving, by a first data center, a resource request message, where the first data center is any data center that receives the resource request message in the system; obtaining, by the first data center and by analyzing the resource request message, at least two destination data centers that provision resources; creating a virtual network; creating a virtual machine for the at least two destination data centers; and adding the virtual machine to the virtual network. By implementing the method, the resource utilization of a data center is improved, administration, maintenance, and operation are simplified, and an occurrence probability of network connection fault or traffic congestion is reduced.

25 Claims, 9 Drawing Sheets

(51) Int. Cl.
*H04L 12/851* (2013.01)
*H04L 12/66* (2006.01)
*G06F 9/455* (2018.01)
*H04L 29/12* (2006.01)
*H04L 12/24* (2006.01)
*H04L 29/08* (2006.01)

(52) U.S. Cl.
CPC ...... *H04L 41/5041* (2013.01); *H04L 41/5054* (2013.01); *H04L 47/24* (2013.01); *H04L 61/2015* (2013.01); *H04L 67/10* (2013.01); *H04L 67/1095* (2013.01); *H04W 56/001* (2013.01); *G06F 2009/4557* (2013.01); *G06F 2009/45595* (2013.01); *H04L 41/0896* (2013.01)

(58) Field of Classification Search
CPC .. H04W 56/001; H04L 12/66; H04L 41/5041; H04L 47/24; H04L 61/2015; H04L 67/10; H04L 67/1095
See application file for complete search history.

(56) References Cited

U.S. PATENT DOCUMENTS

| | | |
|---|---|---|
| 2011/0282975 A1 | 11/2011 | Carter |
| 2012/0030673 A1 | 2/2012 | Sakamoto |
| 2012/0147894 A1 | 6/2012 | Mulligan et al. |
| 2012/0226733 A1 | 9/2012 | Kim et al. |
| 2012/0260019 A1 | 10/2012 | Malaiyandisamy et al. |
| 2013/0268588 A1* | 10/2013 | Chang ................ H04L 12/6418 709/204 |
| 2013/0332577 A1* | 12/2013 | Nakil ................. H04L 41/0668 709/219 |
| 2014/0059226 A1* | 2/2014 | Messerli ................. G06F 9/546 709/226 |
| 2014/0123135 A1* | 5/2014 | Huang ................ H04L 41/5054 718/1 |
| 2015/0052517 A1* | 2/2015 | Raghu .................. G06F 9/4856 718/1 |

FOREIGN PATENT DOCUMENTS

| | | |
|---|---|---|
| CN | 102347979 A | 2/2012 |
| CN | 102404385 A | 4/2012 |
| CN | 102929689 A | 2/2013 |
| CN | 102932279 A | 2/2013 |
| CN | 103067425 A | 4/2013 |
| CN | 103139159 A | 6/2013 |
| CN | 103248659 A | 8/2013 |
| CN | 103703724 A | 4/2014 |

OTHER PUBLICATIONS

Pengwei et al., "Research on Dynamic Deployment for Virtual Machine in Cloud Computing," Computer Measurement and Control, China Academic Journal Electronic Publishing House (2013).
Pawluk et al., "Introducing STRATOS: A Cloud Broker Service," 2012 IEEE Fifth International Conference on Cloud Computing, Honolulu, Hawaii, pp. 891-898, Institute of Electrical and Electronics Engineers, New York, New York (Jun. 24-29, 2012).

* cited by examiner

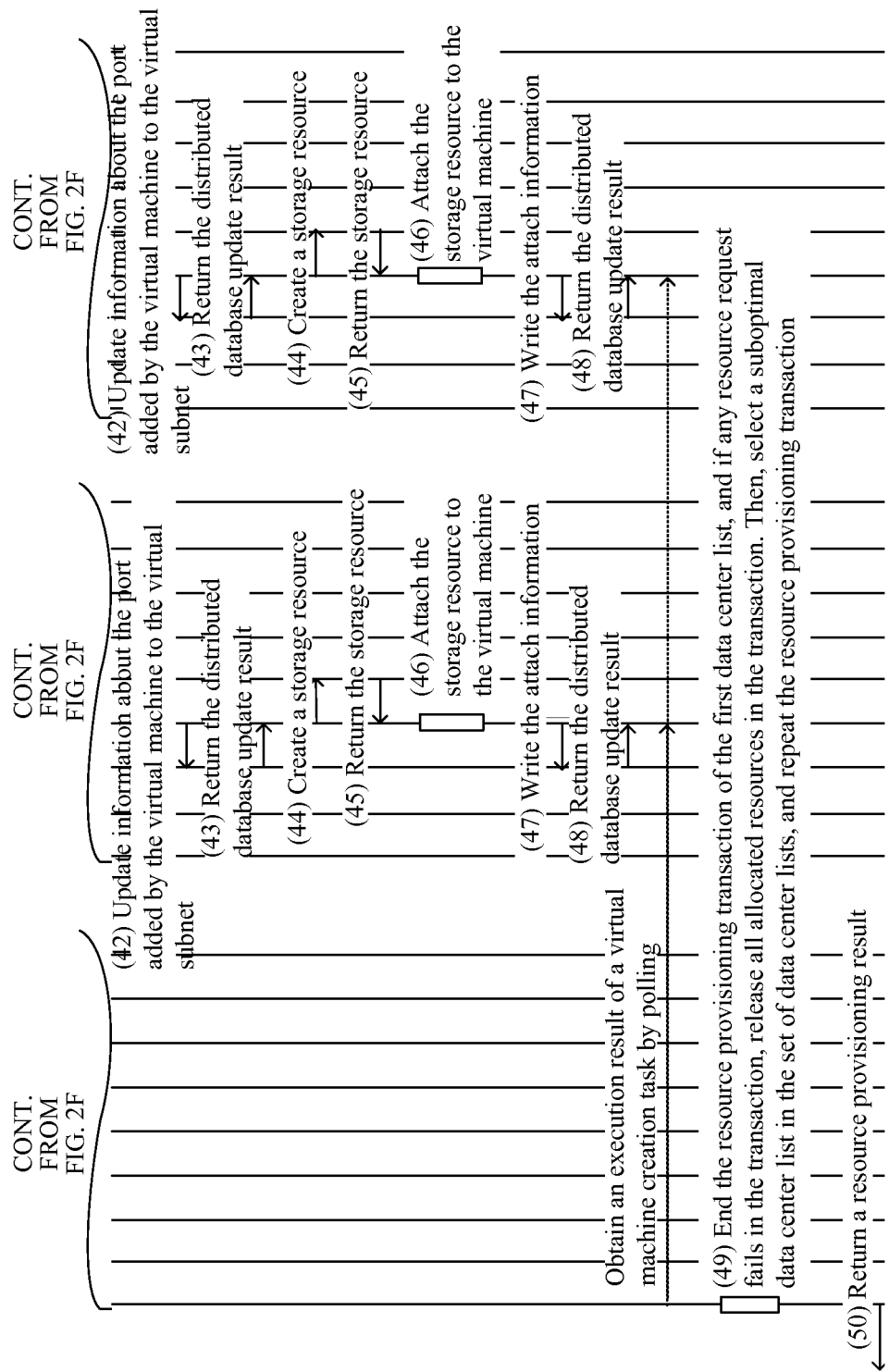

RESOURCE PROVISIONING METHOD

CROSS-REFERENCE TO RELATED APPLICATIONS

This application is a continuation of International Patent Application No. PCT/CN2014/081352, filed on Jul. 1, 2014, which claims priority to International Patent Application No. PCT/CN2013/081514, filed on Aug. 15, 2013, both of which are hereby incorporated by reference in their entireties.

TECHNICAL FIELD

Embodiments of the present invention relates to the field of cloud computing, and in particular, to a resource provisioning method.

BACKGROUND

A conventional large-scale enterprise data center adopts a physical hierarchical architecture. A data center at the top layer is mainly responsible for centralized deployment of enterprise-level global service applications, and a regional data center is used to bear global application images and the applications and data globally shared within the region. When the region covers a large area (for example, covers several countries), server equipment rooms may be further built in each region to cater to applications that have no requirements for global data sharing within the region but have higher requirements for service quality (such as research and development, emulation, continuous large-scale software development, Dynamic Host Configuration Protocol (DHCP), and file service). For a branch office, network equipment rooms are built to solve network access problems of daily office IT equipment such as portable computers and personal computers.

A conventional data center architecture faces a series of problems: software applications are coupled with and bound to physical computing and storage devices, capacity is planned for a single application according to maximum expected load resources, the resource utilization of resources is low, and especially, the server resource utilization is generally less than 15%; physical resources and applications are tightly coupled, and administration, maintenance, and operation such as service deployment, capacity expansion, and upgrade are complex; computing, storage, and network resources across data centers cannot be uniformly scheduled or coordinately managed, and most physical devices are in a live idling state during light traffic or idle time; and excessive data center layers increase data access delay, especially for an application at the top of the hierarchical architecture of the data center, there are too many network nodes and layers that the application must pass through, which increases an occurrence probability of network connection faults or traffic congestion.

SUMMARY

Embodiments of the present invention provide a resource provisioning method to address issues facing a conventional data center architecture, such as low resource utilization, complex administration, maintenance and operation, and a high occurrence probability of network connection faults or traffic congestion.

According to a first aspect, an embodiment of the present invention provides a resource provisioning method that is applied in a distributed data center system, where the system includes at least two data centers, and the method includes:

receiving, by a first data center, a resource request message, where the first data center is any data center that receives the resource request message in the system;

obtaining, by the first data center and by analyzing the resource request message, at least two destination data centers that provision resources;

creating a virtual network;

creating a virtual machine for the at least two destination data centers; and adding the virtual machine to the virtual network.

With reference to the first aspect, in a first possible implementation manner of the first aspect, the obtaining, by the first data center and by analyzing the resource request message, at least two destination data centers that provision resources specifically includes:

forwarding, after a cross-data-center scheduler in the first data center receives the resource request message, the resource request message to an intelligent resource routing module in the first data center, where the resource request message includes a tenant identifier and a resource template identifier;

obtaining, by the intelligent resource routing module, corresponding resource template information according to the tenant identifier and the resource template identifier, where the resource template information includes at least one of a network resource specification parameter and a virtual machine description parameter list; and obtaining, by the intelligent resource routing module and by analyzing the resource template information, the at least two destination data centers that provision resources.

With reference to the first possible implementation manner of the first aspect, in a second possible implementation manner, the obtaining, by the intelligent resource routing module, corresponding resource template information according to the tenant identifier and the resource template identifier specifically includes:

obtaining, by the intelligent resource routing module, the resource template information corresponding to the tenant identifier and the resource template identifier by searching an image template library in the first data center.

With reference to the first possible implementation manner of the first aspect and the second possible implementation manner of the first aspect, in a third possible implementation manner, the obtaining, by the intelligent resource routing module and by analyzing the resource template information, at least two destination data centers that provision resources specifically includes:

searching, by the intelligent resource routing module, a distributed database in the first data center according to the tenant identifier and the resource template information, to obtain the at least two destination data centers corresponding to the tenant identifier and the resource template information.

With reference to the first possible implementation manner of the first aspect, in a fourth possible implementation manner, if the resource request message includes a cross-data-center resource allocation policy, the method further includes:

analyzing the at least two destination data centers according to the cross-data-center resource allocation policy, and obtaining a destination data center that complies with the cross-data-center resource allocation policy.

With reference to the first possible implementation manner of the first aspect, in a fifth possible implementation manner, the creating a virtual network specifically includes:

sending, by the cross-data-center scheduler in the first data center, a request for creating a virtual network to a main network scheduler in the first data center, where the request for creating a virtual network carries the tenant identifier and a network name in the network resource specification parameter;

sending, by the main network scheduler in the first data center, the request for creating a virtual network to a network controller in the first data center;

creating, by the network controller in the first data center, a virtual network according to the tenant identifier and the network name, and writing information about the virtual network into a distributed database in the first data center, where the information about the virtual network includes network ID, network status, network name, and tenant identifier; and synchronizing, by the distributed database in the first data center, the information about the virtual network to a distributed database in another destination data center.

With reference to the first possible implementation manner of the first aspect and the fifth possible implementation manner of the first aspect, in a sixth possible implementation manner, the creating a virtual network further includes:

determining, by the cross-data-center scheduler in the first data center and by analyzing the resource template information, a destination data center for which a virtual subnet needs to be created;

sending, by the main network scheduler in the first data center, the request for creating a virtual subnet to the network controller in the first data center;

creating, by the network controller in the first data center, a virtual subnet according to the request for creating a virtual subnet, and writing information about the virtual subnet into the distributed database in the first data center; and synchronizing, by the distributed database in the first data center, the information about the virtual subnet to the distributed database of another destination data center.

With reference to the fifth possible implementation manner of the first aspect, in a seventh possible implementation manner, the creating a virtual network further includes:

determining, by the cross-data-center scheduler in the first data center and by analyzing the resource template information, a destination data center for which a virtual subnet needs to be created;

sending, by the main network scheduler in the first data center, a request for creating a virtual subnet to the network controller in the first data center, where the request includes the following parameters: tenant identifier, network ID, subnet name, subnet classless inter-domain routing CIDR, subnet Internet Protocol IP address version number, subnet gateway IP address, whether to enable Dynamic Host Configuration Protocol DHCP to allocate an IP address, DHCP IP address pool, destination data center identifier of the virtual subnet to be created, and cross-data-center subnet division mode;

creating, by the network controller in the first data center, a virtual subnet according to the tenant identifier, network ID, and subnet name, and writing information about the virtual subnet into the distributed database in the first data center, where the information about the virtual subnet includes tenant identifier, network ID, subnet name, subnet ID, virtual extensible local area network VxLAN ID, subnet CIDR, and IP address version number; and synchronizing, by the distributed database in the first data center, the information about the virtual subnet to the distributed database of another destination data center.

With reference to the seventh possible implementation manner of the first aspect, in an eighth possible implementation manner, if the request for creating a virtual subnet requires that DHCP be enabled to allocate an IP address for the virtual subnet, and the number of destination data centers for which a virtual subnet needs to be created be not less than two, the method further includes:

performing, by the network controller in the first data center according to the cross-data-center subnet division mode, IP address division and gateway setting for the DHCP IP address pool to be allocated;

sending, by the network controller in the first data center, a request for creating a virtual subnet to a main network scheduler in each data center for which a virtual subnet is to be created, where the request includes the following parameters: tenant identifier, network ID, subnet name, subnet ID, VxLAN ID, subnet CIDR, IP address version number, whether to enable DHCP to allocate an IP address, subnet gateway IP address after division, and DHCP IP address pool after division; and sending, by the main network scheduler in each data center for which a virtual subnet is to be created, the request for creating a virtual subnet to a network controller in respective data centers.

With reference to the eighth possible implementation manner of the first aspect, in a ninth possible implementation manner, the method further includes:

determining, by the network controller that receives the request for creating a virtual subnet, that a virtual subnet indicated in the request for creating a virtual subnet already exists, and creating a virtual service gateway in a local data center.

With reference to the ninth possible implementation manner of the first aspect, in a tenth possible implementation manner, the creating a virtual service gateway in a local data center specifically includes:

sending, by the network controller that receives the request for creating a virtual subnet, a gateway service request to a virtual service gateway VSG manager in the local data center, where the gateway service request carries the following parameters: the subnet ID, whether to enable DHCP to allocate an IP address, the DHCP IP address pool after division, the VxLAN ID, and the subnet gateway IP address after division; and adding, by the VSG manager, a gateway service and a DHCP service to a software service gateway managed by the VSG manager.

With reference to the tenth possible implementation manner of the first aspect, in an eleventh possible implementation manner, the adding a gateway service and a DHCP service specifically includes:

if a VSG virtual machine that already has a gateway service capability is capable of providing a VSG service for a new virtual subnet, adding a network adapter to the existing VSG virtual machine, setting an IP address of the network adapter to the subnet gateway IP address that is set after division and carried in the request for creating a virtual subnet, enabling a DHCP service, and configuring the DHCP IP address pool after division; or creating a new VSG virtual machine, adding two network adapters in the newly created VSG virtual machine, enabling a DHCP service, and configuring the DHCP IP address pool after division, where one network adapter is used to connect to an external network to obtain an IP address from the external network or the IP address of the network adapter is configured to a fixed IP address; and, the other network adapter is used to connect to a virtual subnet, and an IP address of the network adapter is configured to the subnet gateway IP address that is set after division, which is carried in the request for creating a virtual subnet.

With reference to the eleventh possible implementation manner of the first aspect, in a twelfth possible implementation manner, the method further includes:

receiving, by the network controller, a gateway service message returned by the VSG manager, where the message includes a VSG virtual machine identifier; and determining, according to the VSG virtual machine identifier, whether the VSG virtual machine has been added to the virtual subnet, and if the VSG virtual machine is not added to the virtual subnet, creating a port on the virtual subnet and binding the VSG virtual machine to the port.

With reference to the first aspect, in a thirteenth possible implementation manner, the creating a virtual machine for the at least two destination data centers specifically includes:

instructing, by the cross-data-center scheduler in the first data center, computing resource schedulers in the at least two destination data centers to create a virtual machine in respective data centers.

With reference to the first aspect, in a fourteenth possible implementation manner, the adding the virtual machine to the virtual network specifically includes:

requesting, by the computing resource schedulers in the at least two destination data centers through a main network scheduler in respective data centers, a network controller in the local data center to create a port for the virtual machine on the virtual subnet respectively; and obtaining, by the network controller, information about the virtual subnet according to a subnet ID carried in a request for creating a port, creating a port for the virtual machine on the virtual subnet according to the information about the virtual subnet, and binding the virtual machine to the port.

With reference to the fourteenth possible implementation manner of the first aspect, in a fifteenth possible implementation manner, the method further includes:

obtaining, by the computing resource schedulers, information about the port added by the virtual machine to the virtual subnet, determining that the virtual machine is successfully added to the virtual subnet, and then writing a mapping relationship between a virtual machine ID and a port ID into the distributed databases of the data centers to which the computing resource schedulers belong; and synchronizing, by the distributed databases, the mapping relationship between a virtual machine ID and a port ID to a distributed database in another destination data center.

With reference to the first aspect, in a sixteenth possible implementation manner, the method further includes:

sending, by the computing resource schedulers in the at least two destination data centers, a request for creating a storage resource separately to a storage resource scheduler in respective data centers, where the request carries the following parameters: a virtual machine identifier, a storage size, quality of service QoS level of disk access, and a host cluster where a virtual machine is located;

selecting, by the storage resource scheduler, a specific storage resource according to the parameters carried in the request, creating a storage volume meeting the QoS level of disk access and the storage size on the selected storage resource, generating a unique volume identifier, and returning the volume identifier to the computing resource schedulers; and attaching, by the computing resource schedulers, the storage volume to a virtual machine corresponding to the virtual machine identifier, creating an association between the volume identifier and the virtual machine, and generating a unique association identifier.

With reference to the sixteenth possible implementation manner of the first aspect, in a seventeenth possible implementation manner, the method further includes:

writing, by the computing resource schedulers, the virtual machine identifier, the volume identifier, and the association identifier into the distributed databases in the data centers to which the computing resource schedulers belong; and synchronizing, by the distributed databases, the virtual machine identifier, the volume identifier, and the association identifier to a distributed database in another destination data center.

According to a second aspect, an embodiment of the present invention provides a distributed data center system, where the system includes at least a first data center and at least a second data center; and the first data center is configured to receive a resource request message and obtain a resource parameter of the second data center according to the resource request message, where the resource parameter of the second data center includes a virtual machine description parameter list and a network resource specification parameter;

the first data center is configured to create a virtual network according to the resource request message, and the first data center is further configured to send a create request message to the second data center, where the create request message carries the network resource specification parameter and the virtual machine description parameter list; and the second data center is configured to create a virtual subnet for the virtual network according to the network resource specification parameter; and is further configured to create a virtual machine according to the virtual machine description parameter list, and add the virtual machine to the virtual subnet.

With reference to the second aspect, in a first possible implementation manner of the second aspect, that the first data center is configured to receive a resource request message and obtain a resource parameter of the second data center according to the resource request message is specifically that:

a cross-data-center scheduler in the first data center is configured to receive the resource request message and forward the resource request message to an intelligent resource routing module in the first data center; and the intelligent resource routing module in the first data center is configured to obtain the resource parameter of the second data center according to the resource request message, and return the resource parameter of the second data center to the cross-data-center scheduler in the first data center.

With reference to the first possible implementation manner of the second aspect, in a second possible implementation manner, the resource request message carries a tenant identifier and a resource template identifier;

the intelligent resource routing module in the first data center is further configured to search an image template library in the first data center according to the resource template identifier to obtain a resource parameter corresponding to the resource template identifier, and the intelligent resource routing module in the first data center is further configured to search a distributed database in the first data center according to the tenant identifier to obtain a set of data center lists corresponding to the tenant identifier, where that the intelligent resource routing module in the first data center is configured to obtain the resource parameter of the second data center according to the resource request message is specifically that:

the intelligent resource routing module in the first data center is configured to select a destination data center list according to the set of data center lists and the resource parameter corresponding to the resource template identifier, and obtain a resource parameter of each destination data center in the destination data center list, where the destination data center list includes the second data center, and the resource parameters of the destination data centers in the destination data center list include the resource parameter of the second data center.

With reference to the second aspect, in a third possible implementation manner of the second aspect, that the first data center is configured to receive a resource request message and obtain a resource parameter of the second data center according to the resource request message is specifically that:

a cross-data-center scheduler in the first data center is configured to receive the resource request message and forward the resource request message to an intelligent resource routing module in the first data center, where the resource request message carries a tenant identifier and a resource template identifier;

the intelligent resource routing module in the first data center is configured to search a distributed database in the first data center according to the tenant identifier to obtain a set of data center lists corresponding to the tenant identifier, and to obtain, according to the resource template identifier, a resource parameter corresponding to the resource template identifier;

the intelligent resource routing module is further configured to return a resource search response to the cross-data-center scheduler in the first data center, where the resource search response carries the set of data center lists and the resource parameter corresponding to the resource template identifier; and the cross-data-center scheduler in the first data center is configured to select a destination data center list according to the set of data center lists and the resource parameter corresponding to the resource template identifier, and obtain a resource parameter of each destination data center in the destination data center list, where the destination data center list includes the second data center, and the resource parameters of the destination data centers in the destination data center list include the resource parameter of the second data center.

With reference to the second aspect, or any implementation manner of the first possible implementation manner of the second aspect to the third possible implementation manner of the second aspect, in a fourth possible implementation manner of the second aspect, that the first data center is configured to send a create request message to the second data center includes that:

the cross-data-center scheduler in the first data center is configured to send a request for creating a virtual subnet to a main network scheduler in the second data center by using a network controller in the first data center, where the request for creating a virtual subnet carries the network resource specification parameter of the second data center; and the cross-data-center scheduler in the first data center is further configured to send a request for creating a virtual machine to a computing resource scheduler in the second data center, where the request for creating a virtual machine carries the virtual machine description parameter list of the second data center.

With reference to the fourth possible implementation manner of the second aspect, in a fifth possible implementation manner of the second aspect, that the second data center is configured to create a virtual subnet for the virtual network according to the network resource specification parameter is specifically that: the main network scheduler in the second data center is configured to send a request for creating a virtual subnet to a network controller in the second data center according to the network resource specification parameter, where the network controller in the second data center creates the virtual subnet for the virtual network; and the network controller in the second data center is further configured to return information about the virtual subnet to the cross-data-center scheduler in the first data center by using the main network scheduler in the second data center.

With reference to the second aspect, or any implementation manner of the first possible implementation manner of the second aspect to the fifth possible implementation manner of the second aspect, in a sixth possible implementation manner of the second aspect, if the network controller in the first data center is further configured to perform IP address pool division and subnet gateway IP address setting according to a data center identifier list of the virtual subnet and a cross-data-center subnet division mode, the network resource specification parameter of the second data center includes a subnet gateway IP address after setting and an IP address pool after division.

With reference to the sixth possible implementation manner of the second aspect, in a seventh possible implementation manner of the second aspect, that the second data center is configured to create a virtual subnet for the virtual network according to the network resource specification parameter is specifically that: the network controller in the second data center is configured to create a virtual service gateway in the second data center according to the subnet gateway IP address after setting and the IP address pool after division.

With reference to the seventh possible implementation manner of the second aspect, in an eighth possible implementation manner of the second aspect, that the network controller in the second data center is configured to create a virtual service gateway in the second data center is specifically that:

the network controller in the second data center is configured to send a gateway service request to a virtual service gateway VSG manager in the second data center, where the gateway service request carries the subnet gateway IP address after setting and the IP address pool after division; and the VSG manager is configured to add, according to the gateway service request, a gateway service and a DHCP service to a software service gateway managed by the VSG manager.

With reference to the eighth possible implementation manner of the second aspect, in a ninth possible implementation manner of the second aspect, that the VSG manager is configured to add, according to the gateway service request, a gateway service and a DHCP service to a software service gateway managed by the VSG manager is specifically that:

if a VSG virtual machine that already has a gateway service capability is capable of providing a VSG service for the virtual subnet, a network adapter is added to the VSG virtual machine, an IP address of the network adapter is set to the subnet gateway IP address after setting, which is carried in the gateway service request, a DHCP service is enabled, and the IP address pool after division is configured.

With reference to the eighth possible implementation manner of the second aspect, in a tenth possible implementation manner of the second aspect, that the VSG manager is configured to add, according to the gateway service request, a gateway service and a DHCP service to a software service gateway managed by the VSG manager is specifically that:

the VSG manager is configured to: create a VSG virtual machine, add a network adapter to the VSG virtual machine, enable a DHCP service, and configure the IP address pool after division, where the network adapter is used to connect to the virtual subnet, and an IP address of the network adapter is configured to the subnet gateway IP address after setting, which is carried in the gateway service request.

The resource provisioning method according to embodiments of the present invention, by means of interaction between distributed cloud operating systems deployed in all data centers, performs corresponding resource provisioning steps to make infrastructure resources of all data centers become a unified "logical resource pool", which achieves global availability of resources and supports flexible scheduling of resources across physical data centers. In this way, the resource utilization of a data center is improved, administration, maintenance, and operation are simplified, and an occurrence probability of network connection faults or traffic congestion is reduced.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following descriptions show some embodiments of the present invention.

FIGS. 2A-2G are parts of a schematic flowchart when a resource provisioning method according to an embodiment of the present invention is applied to a specific scenario.

DESCRIPTION OF EMBODIMENTS

Figure 1A:
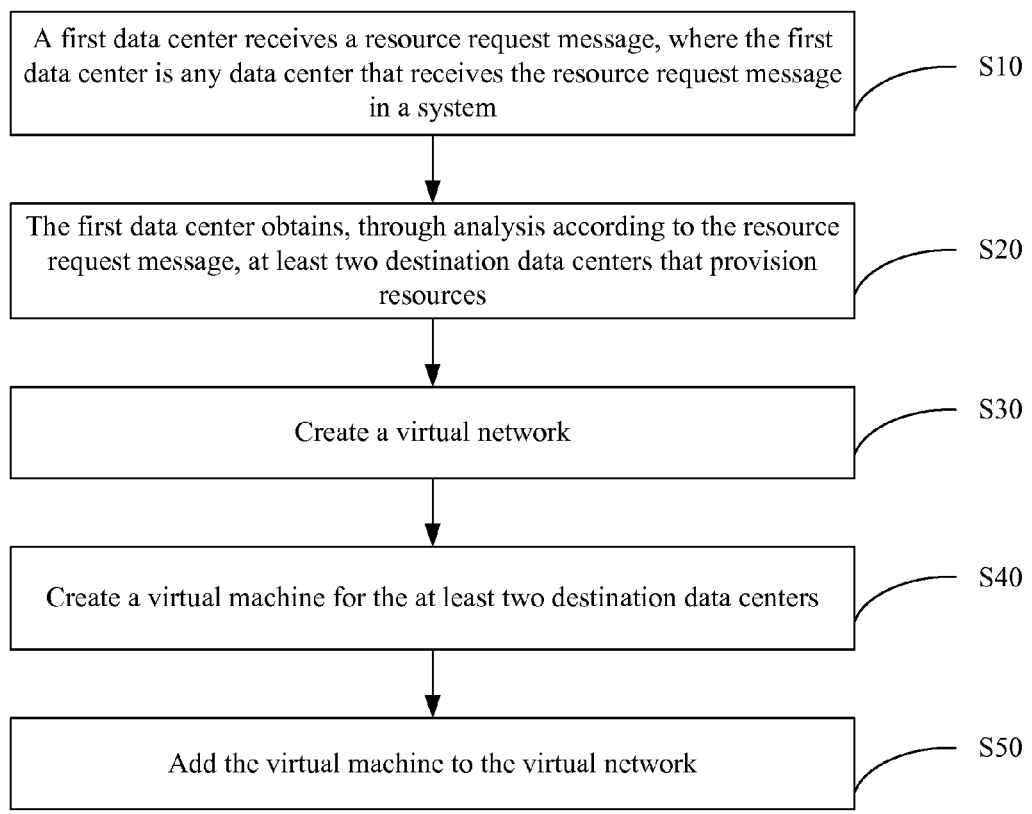
FIG. 1a is a flowchart block diagram of a resource provisioning method according to an embodiment of the present invention.

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention.

It should be noted that the term "and/or" in this document is only an association relationship for describing the associated objects, and represents that three relationships may exist, for example, A and/or B may represent the following three cases: only A exists, and both A and B exist, and only B exists. In addition, the character "/" in this document usually represents that the associated objects are in an "or" relationship.

Further, it should be noted that the data center in this document refers to a collection of computing resources, storage resources, and network resources, which may be a physical data center or a logical data center. Correspondingly, the method in this document can be applied to a physical data center and a logical data center so long as the data center includes computing resources, storage resources, and network resources.

Technical solutions provided in embodiments of the present invention, by deploying identical distributed cloud operating systems in all data centers, transform a conventional data center architecture featuring enterprise hierarchical management and level-by-level network interconnection into a distributed data center architecture featuring totally flat management and point-to-point full interconnection. In this architecture, all physical data center nodes on the whole network, despite different quantities of accommodated resources and different types of accommodated services, may be considered as completely equivalent from the perspective of management and scheduling, and there may be no master/slave management relationship. That is, all infrastructure resources serve as a unified "logical resource pool", which achieves global availability of resources, supports flexible scheduling of resources across physical data centers, and solves problems facing the conventional data center architecture such as low resource utilization, complex administration, maintenance, and operation, and a high occurrence probability of network connection faults or traffic congestion.

To help clearly understand the technical solutions provided in embodiments of the present invention, the following briefly describes the distributed cloud operating system deployed in each data center. The system mainly includes:

cross-data-center scheduler: is configured to provision resources across multiple data centers;

intelligent resource routing module: obtains a list of data centers that need to request resources by analyzing parameters in a resource request message;

distributed database: is responsible for storing global data of a distributed cloud data center, where the same data can be found in the distributed database in each data center;

computing resource scheduler: is responsible for provisioning computing resources in a local data center, and attaching storage resources and adding the computing resources to a virtual network;

storage resource scheduler: is responsible for provisioning storage resources in a local data center;

main network scheduler: is responsible for establishing a global virtual network, a virtual subnet, and a virtual service gateway, where the virtual network includes one or more virtual subnets, and the virtual subnet can be distributed in one or more data centers;

network controller: is responsible for scheduling software definition networks in a data center, managing virtual switches (vSwitch) and ports, and mapping ports to virtual extensible local area network (VxLAN) when computing resources are added to a virtual network;

virtual service gateway (VSG) manager: is responsible for creating a virtual service gateway in a virtual network, such as one or more services in the following services: route service, Dynamic Host Configuration Protocol (DHCP) Server service, VxLAN gateway service, network address translation (NAT) service, access control list (ACL) service, virtual private network (VPN) service, and software load balancing service; and image template library: provides an image and a template service required to create a virtual machine, where a template can describe specification requirements of a single virtual machine or can include descriptions of multiple virtual machines and even networking (a network between virtual machines).

Based on the foregoing distributed data center architecture and distributed cloud operating system, embodiments of the present invention provide a resource provisioning method. FIG. 1a is a flowchart block diagram of a resource provisioning method according to an embodiment of the present invention. As shown in FIG. 1a, the resource provisioning method includes the following steps:

S10. A first data center receives a resource request message, where the first data center is any data center that receives the resource request message in the system.

It should be noted that the resource provisioning method according to embodiments of the present invention is applied to a distributed data center architecture. This architecture includes two or more physical data centers, and all physical data centers in this architecture, regardless of whether the number of accommodated resources and the type of accommodated services are the same, may be considered as completely equivalent from the perspective of management and scheduling, and there may be no master/slave management relationship between the data centers. The first data center is any data center that receives the resource request message from the distributed data center architecture.

S20. The first data center obtains, through analysis according to the resource request message, at least two destination data centers that provision resources.

Specifically, a cross-data-center scheduler in the first data center, after receiving the resource request message, forwards the resource request message to an intelligent resource routing module in the first data center, where the resource request message includes a tenant identifier and a resource template identifier; the intelligent resource routing module searches an image template library of the first data center according to the tenant identifier and the resource template identifier, to obtain resource template information corresponding to the resource template identifier, and the resource template information includes a virtual machine description parameter list and/or a network resource specification parameter; and the intelligent resource routing module searches a distributed database in the first data center according to the tenant identifier and the resource template information, to obtains a destination data center list corresponding to the tenant identifier and the resource template information.

If the resource request message also carries parameters: designated data center and designated data center identifier list, an intersection of the obtained destination data center list and the designated data center identifier list is calculated.

If the resource request message also includes a cross-data-center resource allocation policy (such as even allocation of resources and proportion allocation by idle resource), the obtained destination data center list is analyzed according to the cross-data-center resource allocation policy to obtain a destination data center list that complies with the cross-data-center resource allocation policy.

S30. Create a virtual network.

It should be noted that the virtual network includes one or more virtual subnets, where the virtual subnets can be distributed in one or more data centers.

Specifically, the cross-data-center scheduler in the first data center sends a request for creating a virtual network to a main network scheduler in the first data center, where the request for creating a virtual network carries the tenant identifier and a network name in the network resource specification parameter.

The main network scheduler in the first data center sends the request for creating a virtual network to a network controller in the first data center.

The network controller in the first data center creates a virtual network according to the tenant identifier and the network name, and writes information about the virtual network into a distributed database in the first data center, where the information about the virtual network includes network identifier (ID), network status, network name, and tenant identifier.

The distributed database in the first data center synchronizes the information about the virtual network to a distributed database in another data center in the system.

Further, the cross-data-center scheduler in the first data center determines a destination data center for which a virtual subnet needs to be created by analyzing the resource template information.

A request for creating a virtual subnet is sent to the network controller through the main network scheduler, where the request includes the following parameters: the tenant identifier, the network ID, subnet name, subnet classless inter-domain routing (CIDR), subnet Internet Protocol (IP) address version number, subnet gateway IP address, whether to enable Dynamic Host Configuration Protocol DHCP to allocate an IP address, DHCP IP address pool, an identifier list of data centers for which a virtual subnet is to be created, and cross-data-center subnet division mode.

The network controller creates a virtual subnet (including a globally unique VxLAN ID allocated for the virtual subnet) according to the tenant identifier, network ID, and subnet name, and writes information about the virtual subnet into the distributed database, where the information about the virtual subnet includes the tenant identifier, the network ID, the subnet name, subnet ID, VxLAN ID, the subnet CIDR, and the IP address version number.

The distributed database synchronizes the information about the virtual subnet to a distributed database in another data center in the system.

Further, if the identifier list of data centers for which a virtual subnet is to be created includes at least two data centers, and DHCP is required to be enabled to allocate an IP address for the virtual subnet, the network controller performs, according to the cross-data-center subnet division mode, IP address division and gateway setting for the DHCP IP address pool to be allocated.

The network controller sends a request for creating a virtual subnet to a main network scheduler in each data center in the identifier list of data centers for which a virtual subnet is to be created, where the request includes the following parameters: tenant identifier, network ID, subnet name, subnet ID, VxLAN ID, subnet CIDR, IP address version number, whether to enable DHCP to allocate an IP address, subnet gateway IP address after division, and DHCP IP address pool after division; and The main network scheduler in each data center in the identifier list of data centers for which a virtual subnet is to be created sends the request for creating a virtual subnet to a network controller in respective data centers.

Further, if the network controller that receives the request for creating a virtual subnet determines that a virtual subnet indicated by a parameter in the request for creating a virtual subnet already exists, the network controller creates a virtual service gateway in a local data center.

The creating a virtual service gateway in a local data center specifically includes that:

the network controller that receives the request for creating a virtual subnet, sends a gateway service request to a VSG manager in the local data center, where the gateway service request carries the following parameters: subnet ID, whether to enable DHCP to allocate an IP address, DHCP IP address pool after division, VxLAN ID, and subnet gateway IP address after division; and the VSG manager adds a gateway service and a DHCP service to a software service gateway managed by the VSG manager.

The adding a gateway service and a DHCP service specifically includes:

if a VSG virtual machine that already has a gateway service capability is capable of providing a VSG service for a new virtual subnet, adding a network adapter to the existing VSG virtual machine, setting an IP address of the network adapter to the subnet gateway IP address after division, which is carried in a parameter of the request for creating a virtual subnet, enabling a DHCP service, and configuring the DHCP IP address pool after division; or creating a new VSG virtual machine, adding two network adapters in the newly created VSG virtual machine, enabling a DHCP service, and configuring the DHCP IP address pool after division, where one network adapter is used to connect to an external network to obtain an IP address from the external network or the IP address of the network adapter is configured to a fixed IP address; and, the other network adapter is used to connect to a virtual subnet, and an IP address of the other network adapter is configured to the subnet gateway IP address after division, which is carried in a parameter of the request for creating a virtual subnet.

Further, the network controller receives a gateway service message returned by the VSG manager, where the message includes a VSG virtual machine identifier.

The network controller determines, according to the VSG virtual machine identifier, whether the VSG virtual machine has been added to the virtual subnet, and if the VSG virtual machine is not added to the virtual subnet, creates a port on the virtual subnet and binds the VSG virtual machine to the port.

S40. Create a virtual machine for the at least two destination data centers.

Specifically, the cross-data-center scheduler in the first data center instructs computing resource schedulers in the at least two destination data centers to create a virtual machine in respective data centers.

S50. Add the virtual machine to the virtual network.

Specifically,

The computing resource schedulers in the at least two destination data centers request, through a main network scheduler in respective data centers, a network controller in the local data center to create a port for the virtual machine on the virtual subnet.

The network controller obtains information about the virtual subnet according to a subnet ID carried in a request for creating a port, creates a port for the virtual machine on the virtual subnet according to the information about the virtual subnet, and binds the virtual machine to the port.

The computing resource schedulers obtain information about a port added by the virtual machine to the virtual subnet, determined that the virtual machine is successfully added to the virtual subnet, and then writing a mapping relationship between a virtual machine ID (i.e., virtual machine identifier) and a port ID (i.e., port identifier) into distributed databases in the data centers to which the computing resource schedulers belong.

The distributed databases synchronize the mapping relationship between a virtual machine ID and a port ID to a distributed database in another destination data center.

Further, storage resources may be allocated to the virtual machine, which specifically includes that:

the computing resource schedulers in the at least two destination data centers, send a request for creating a storage resource to a storage resource scheduler in respective data centers, where the request carries the following parameters: a virtual machine identifier, a storage size, quality of service (QoS) level of disk access, and a host cluster where the virtual machine is located;

the storage resource scheduler selects a specific storage resource according to parameters carried in the request, creates a storage volume meeting the QoS level of disk access and the storage size on the selected storage resource, generates a unique volume identifier, and returns the volume identifier to the computing resource schedulers;

the computing resource scheduler attaches the storage volume to a virtual machine represented by the virtual machine identifier, creates an association between the volume identifier and the virtual machine, and generates a unique association identifier;

the computing resource scheduler writes the virtual machine identifier, the volume identifier, and the association identifier into the distributed database in the local data center; and the distributed database synchronizes the virtual machine identifier, the volume identifier, and the association identifier to a distributed database in another destination data center.

The resource provisioning method according to embodiments of the present invention, through interaction between distributed cloud operating systems deployed in all data centers, performs corresponding resource provisioning steps to make infrastructure resources of all data centers become a unified "logical resource pool", which achieves global availability of resources and supports flexible scheduling of resources across physical data centers. In this way, the resource utilization of a data center is improved, administration, maintenance, and operation are simplified, and an occurrence probability of network connection failure or traffic congestion is reduced.

To make the technical solutions of the present invention more comprehensible, the following further describes the technical solutions according to the embodiments of the present invention with reference to the specific application scenarios.

Figure 1B:
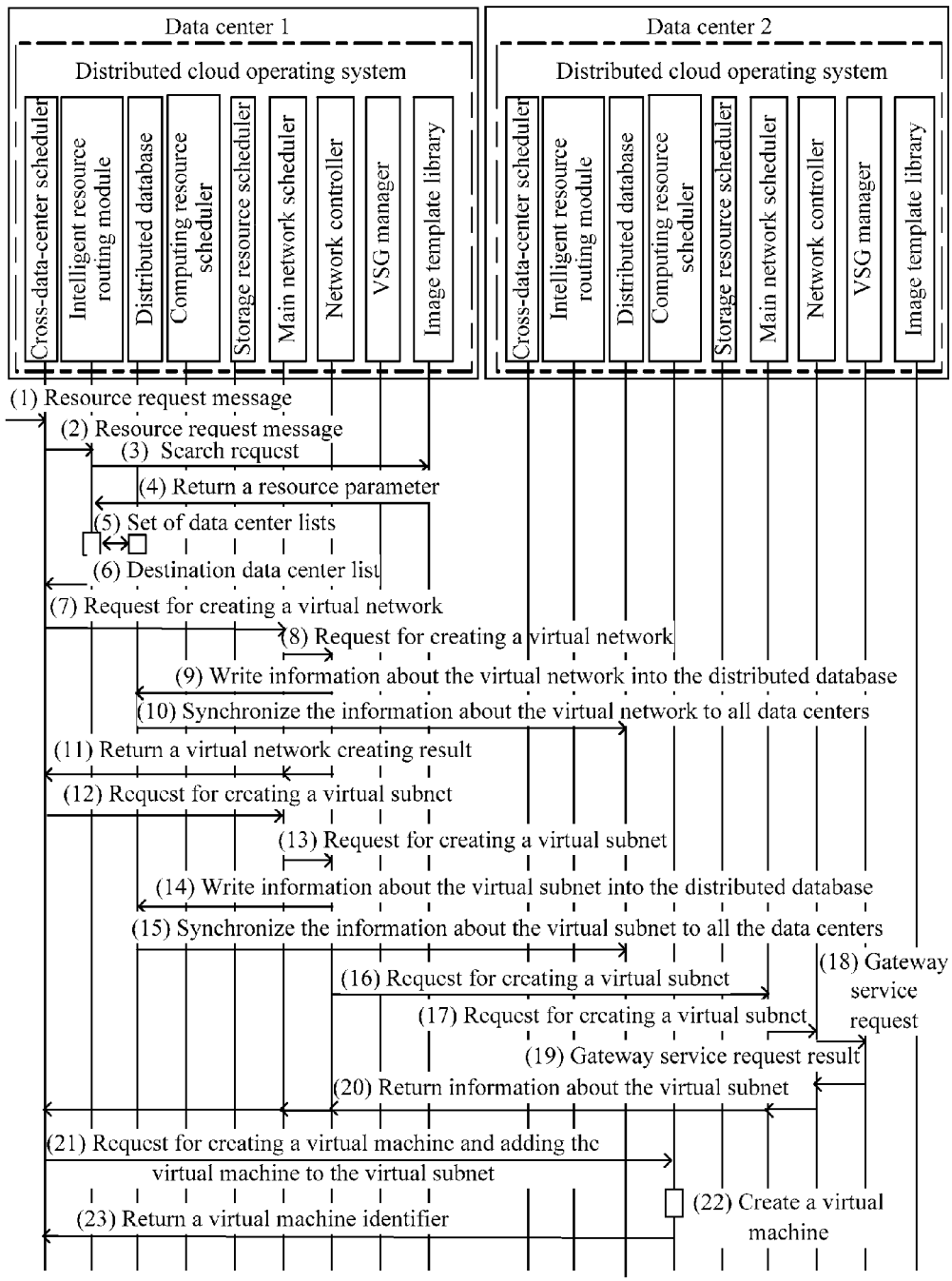
FIG. 1b is a schematic diagram of a resource request processing process applied to a distributed data center system according to an embodiment of the present invention.
Figure 2A:
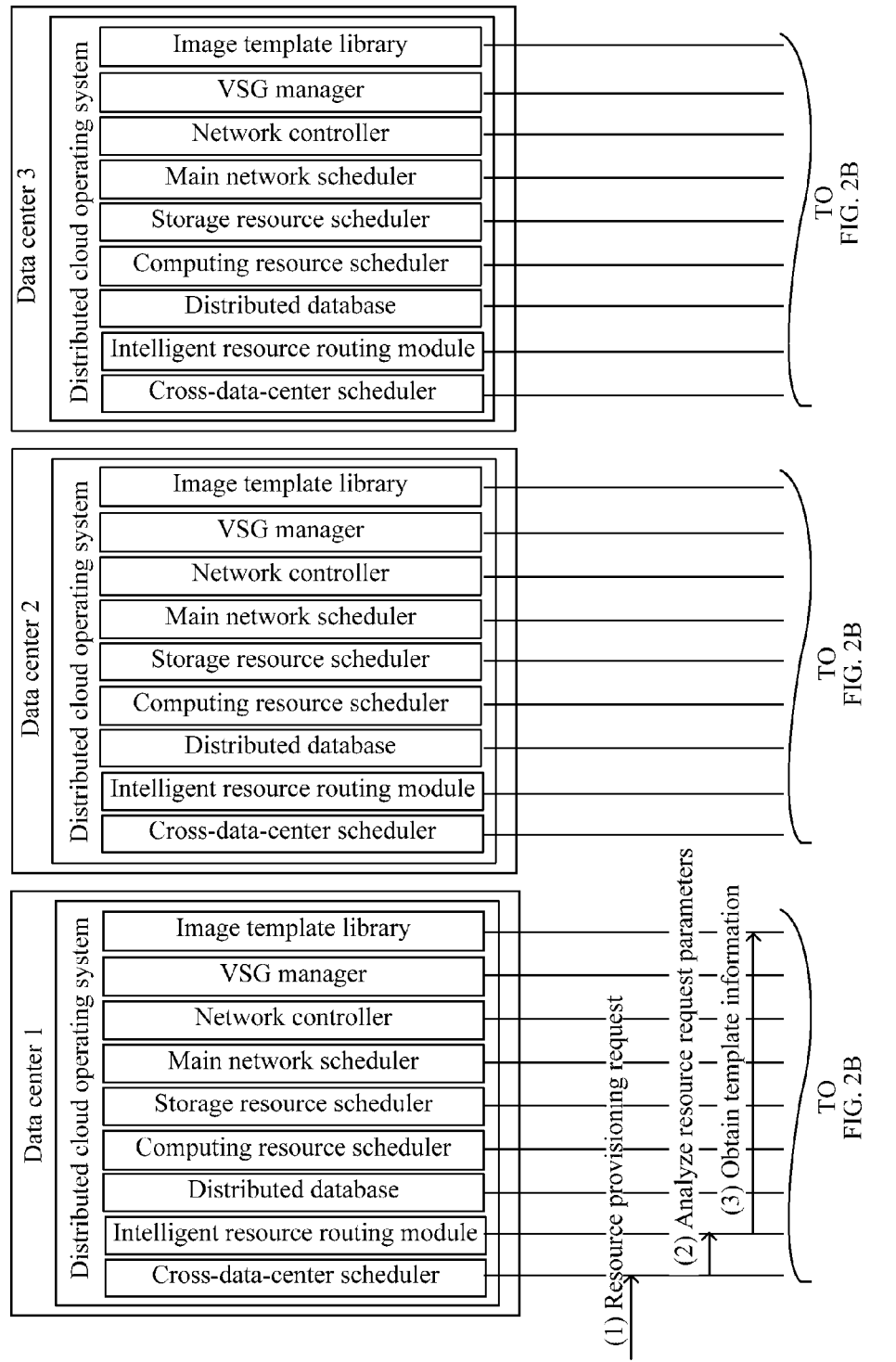
Figure 2B:
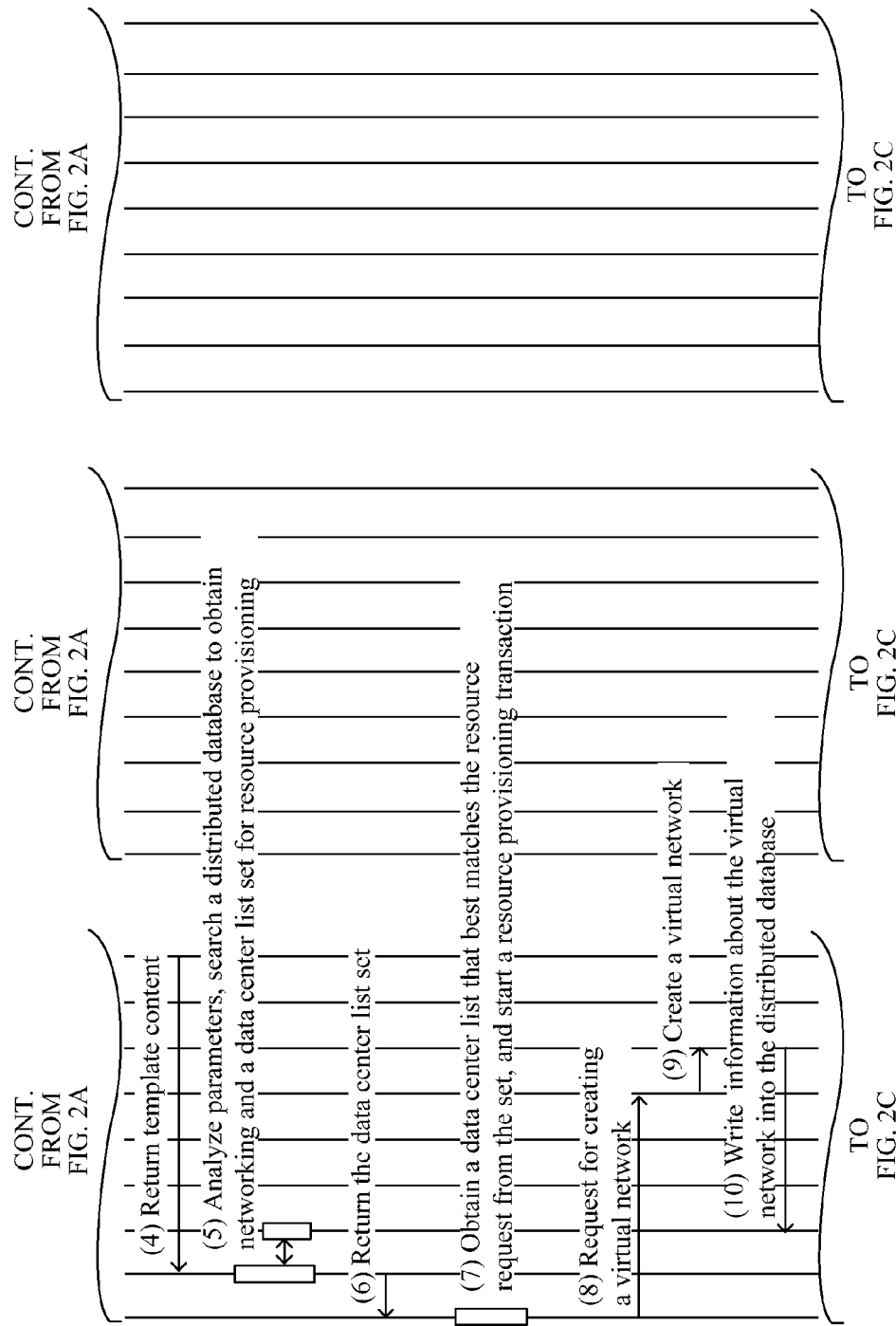
Figure 2C:
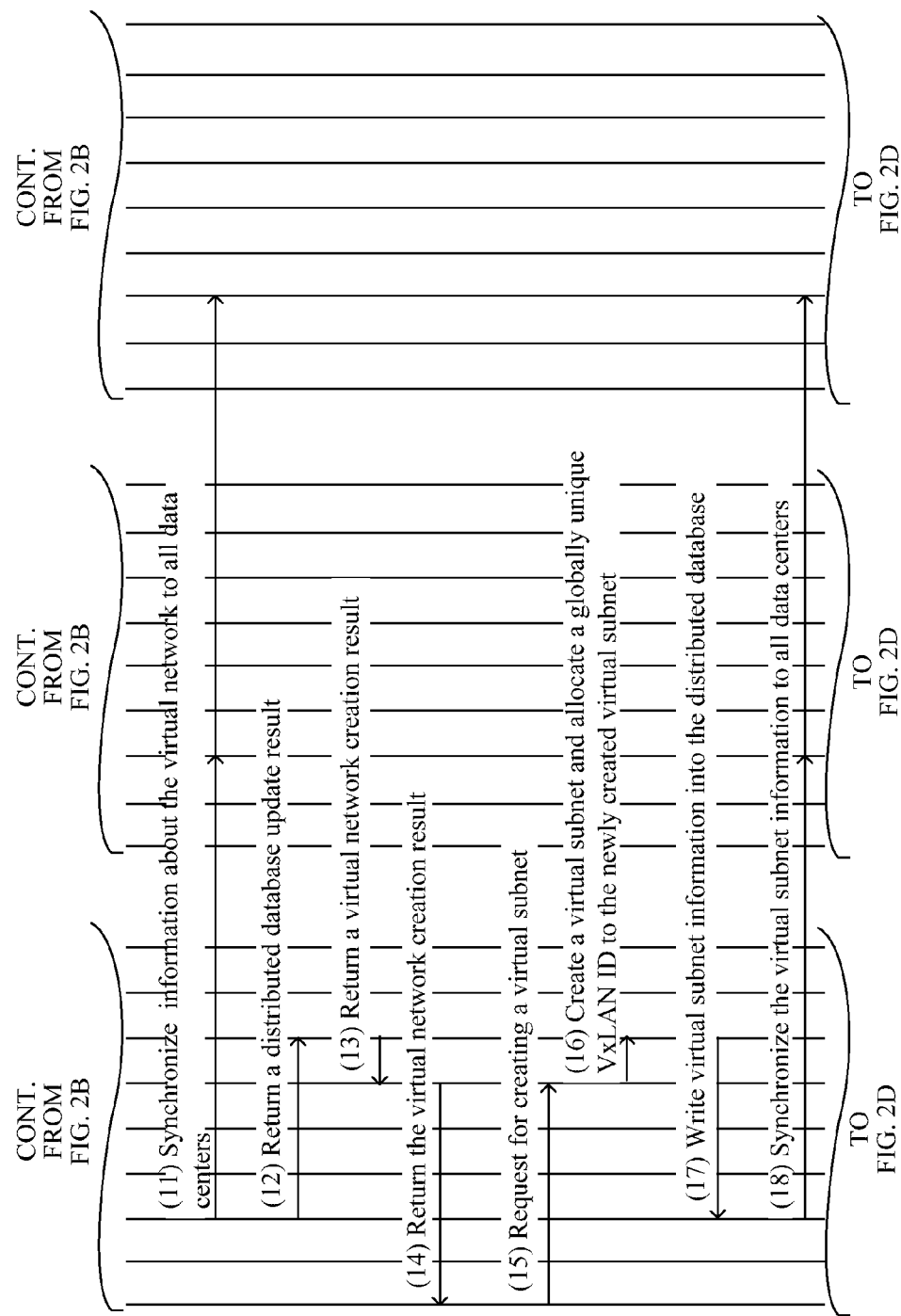
Figure 2D:
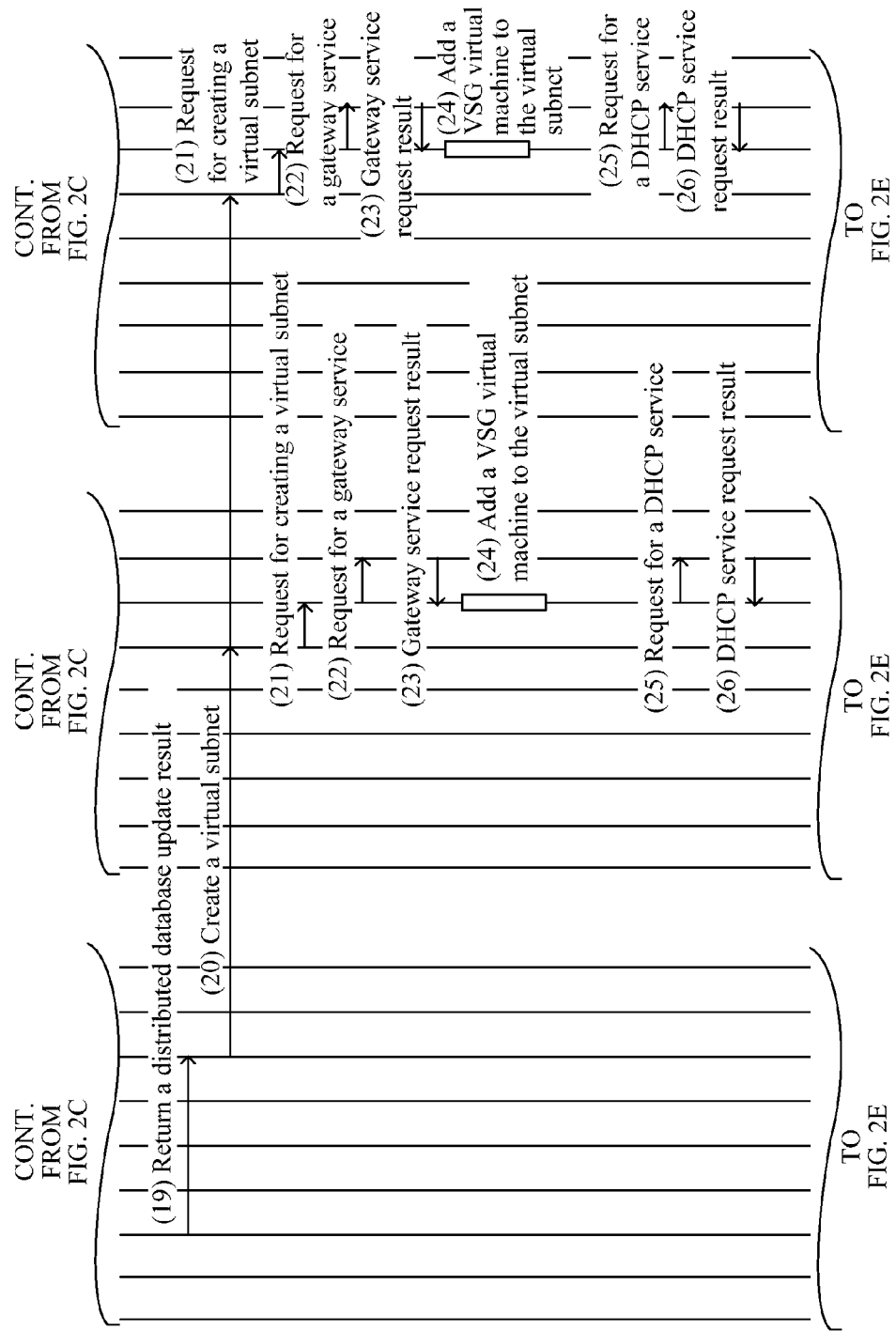
Figure 2E:
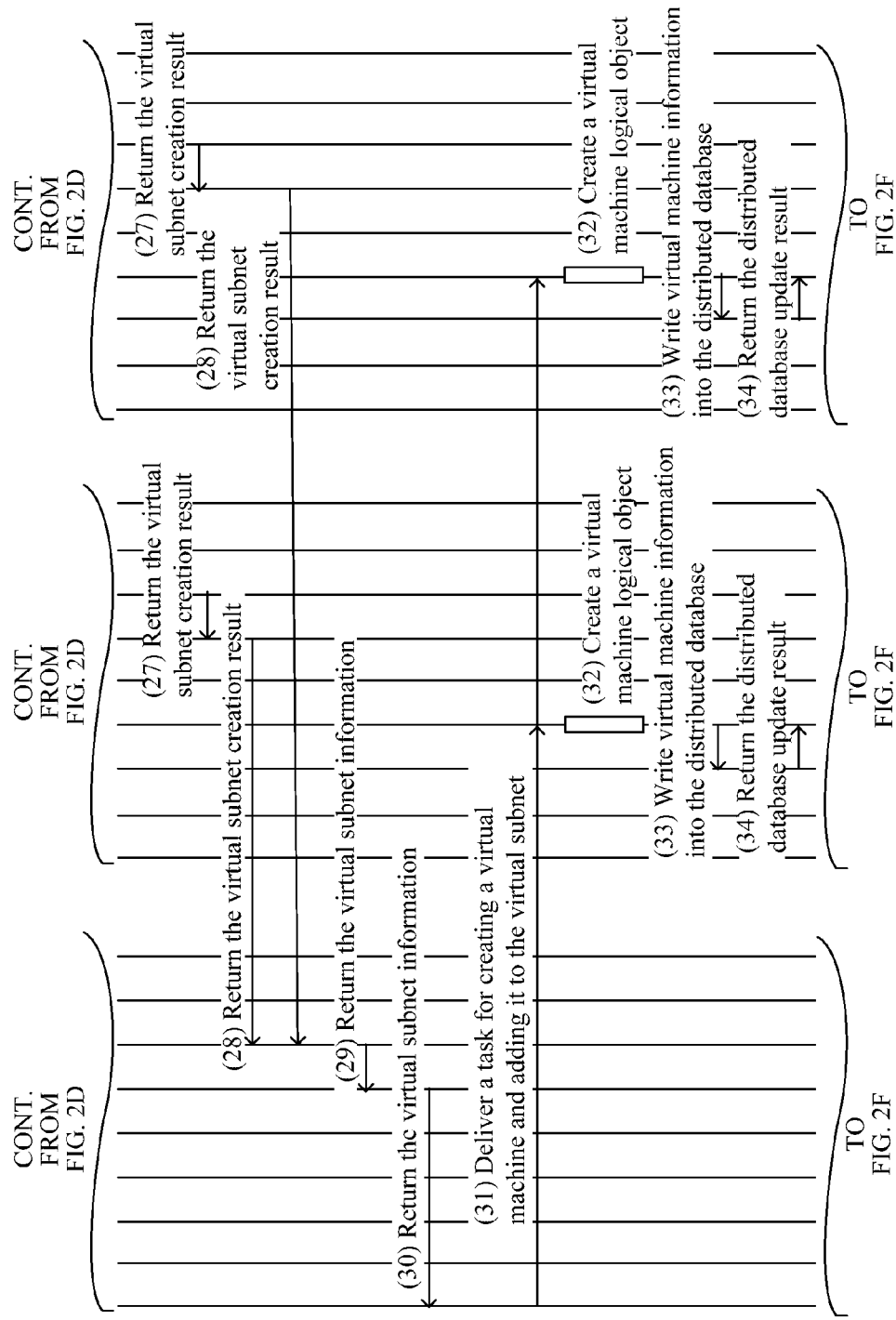
Figure 2F:
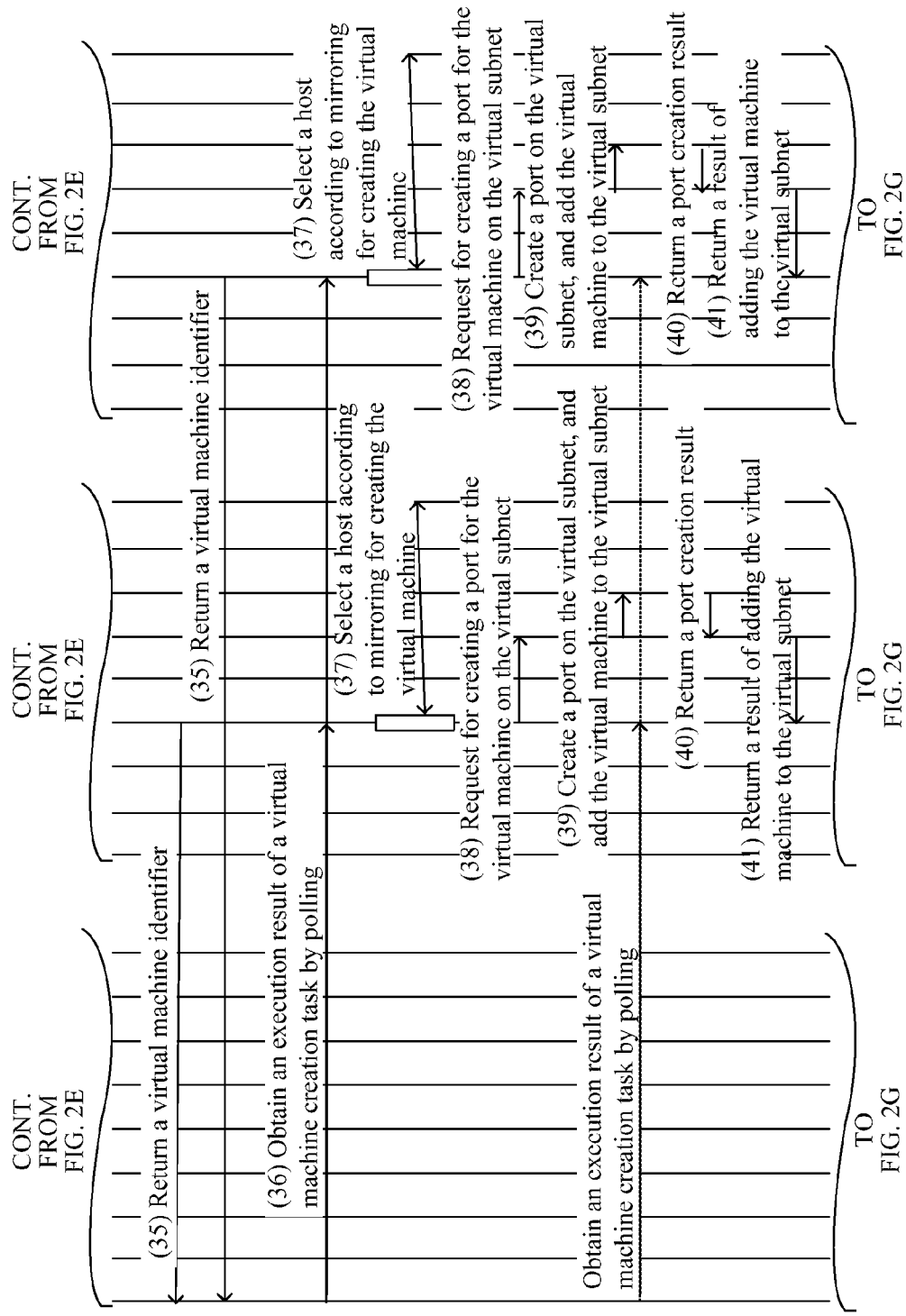

FIG. 1b is a schematic diagram of a resource request processing process applied to a distributed data center system according to an embodiment of the present invention. In a distributed data center system in FIG. 1b, there are two data centers, where data center 1 receives a resource request from a tenant. It should be noted that in actual application, any data center can receive a resource request from the tenant, and functions of all data centers are equivalent. This embodiment uses two data centers as examples for description, and in actual application, the number of data centers is not limited. As shown in FIG. 1b, the specific process includes the following steps:

(1) A cross-data-center scheduler in data center 1 receives a resource request message. The resource request message carries a tenant identifier and a resource template identifier.

(2) The cross-data-center scheduler in data center 1 forwards the resource request message to an intelligent resource routing module in data center 1.

(3) The intelligent resource routing module in data center 1 sends a search request to an image template library in data center 1, where the search request carries the resource template identifier.

(4) The intelligent resource routing module in data center 1 receives a resource parameter corresponding to the resource template identifier and returned by the image template library in data center 1.

(5) The intelligent resource routing module in data center 1 searches a distributed database in data center 1 according to the tenant identifier, to obtains a set of data center lists.

(6) The intelligent resource routing module in data center 1 selects a destination data center list according to the set of data center lists and the resource parameter corresponding to the resource template identifier, and obtains a resource parameter of each destination data center in the destination data center list. The intelligent resource routing module in data center 1 returns the destination data center list and the resource parameter of each destination data center in the destination data center list to the cross-data-center scheduler in data center 1.

The destination data center list includes at least data center 1 and at least data center 2. Correspondingly, the resource parameters of the destination data centers in the destination data center list include a resource parameter of data center 1 and a resource parameter of data center 2.

In another implementation manner, the foregoing step (6) is changed to:

(6a) The intelligent resource routing module in data center 1 returns a resource search response to the cross-data-center scheduler in data center 1, where the resource search response carries the set of data center lists and the resource parameter corresponding to the resource template identifier.

(6b) The cross-data-center scheduler in data center 1 selects a destination data center list according to the set of data center lists and the resource parameter corresponding to the resource template identifier, and obtains a resource parameter of each destination data center in the destination data center list, where the destination data center list includes the second data center, and the resource parameters of the destination data centers in the destination data center list include a resource parameter of the second data center.

Specifically, the resource parameter includes a virtual machine description parameter list and a network resource specification parameter that are of each data center.

(7) If a virtual network represented by a network name in the network resource specification parameter does not exist, the cross-data-center scheduler in data center 1 sends a request for creating a virtual network to a main network scheduler in data center 1.

(8) The main network scheduler in data center 1 sends the request for creating a virtual network to a network controller in data center 1.

(9) The network controller in data center 1 creates a virtual network for the resource request message according to the tenant identifier and the network name, and generates a unique network identifier, ID of the virtual network; and writes information about the virtual network (the tenant identifier, the network name, and the ID of the virtual network) into the distributed database in data center 1.

(10) The distributed database in data center 1 synchronizes the information about the virtual network to a distributed database in another data center.

(11) The network controller in data center 1 returns a virtual network creating result to the cross-data-center scheduler in data center 1 by using the main network scheduler in data center 1.

It should be noted that there is no limitation in order of (9) and (11).

(12) If the virtual network is successfully created, the cross-data-center scheduler in data center 1 sends a request for creating a virtual subnet to the main network scheduler in data center 1.

(13) The main network scheduler in data center 1 sends the request for creating a virtual subnet to the network controller in data center 1, and the network controller in data center 1 creates, according to the network resource specification parameter of data center 1, a virtual subnet for the virtual network, and generates a unique subnet identifier, an ID of the virtual subnet.

(14) The network controller in data center 1 writes information about the virtual subnet (the tenant identifier, the network name, the ID of the virtual network, and the ID of the virtual subnet) into the distributed database in data center 1.

(15) The distributed database in data center 1 synchronizes the information about the virtual subnet to a distributed database in another data center.

(16) The network controller in data center 1 performs virtual subnet division according to the network resource specification parameter of data center 1, and when it is determined that a virtual subnet also needs to be created in data center 2, the network controller in data center 1 sends a request for creating a virtual subnet to a main network scheduler in data center 2, where the request for creating a virtual subnet carries information about the virtual subnet and the network resource specification parameter of data center 2.

Specifically, if the network controller in data center 1 performs IP address pool division and subnet gateway IP address setting according to a data center identifier list of the virtual subnet and a cross-data-center subnet division mode, the network resource specification parameter of data center 2 includes a subnet gateway IP address after setting and an IP address pool after division.

(17) The main network scheduler in data center 2 sends a request for creating a virtual subnet to a network controller in data center 2 according to the network resource specification parameter of data center 2.

(18) The network controller in data center 2 receives the request for creating a virtual subnet, and creates, if it is determined that the virtual subnet indicated by the tenant identifier, the ID of the virtual network, and the network name exists, a virtual service gateway in data center 2 according to the subnet gateway IP address after setting and the IP address pool after division.

That the virtual service gateway is created in data center 2 is specifically that: the network controller in data center 2 sends a gateway service request to a virtual service gateway VSG manager in data center 2, where the gateway service request carries the subnet gateway IP address after setting and the IP address pool after division; and the VSG manager is configured to add, according to the gateway service request, a gateway service and a DHCP service to a software service gateway managed by the VSG manager.

That the VSG manager adds, according to the gateway service request, a gateway service and a DHCP service to a software service gateway managed by the VSG manager is specifically that:

if a VSG virtual machine that already has a gateway service capability is capable of providing a VSG service for the virtual subnet, a network adapter is added to the VSG virtual machine, an IP address of the network adapter is set to the subnet gateway IP address after setting, which is carried in the gateway service request, a DHCP service is enabled, and the IP address pool after division is configured; or the VSG manager is configured to: create a VSG virtual machine, add a network adapter to the VSG virtual machine, enable a DHCP service, and configure the IP address pool after division, where the network adapter is used to connect to the virtual subnet, and an IP address of the network adapter is configured to the subnet gateway IP address after setting, which is carried in the gateway service request.

(19) The VSG manager returns a gateway service request result to the network controller in data center 2.

(20) The network controller in data center 2 returns the information about the virtual subnet to the cross-data-center scheduler in data center 1 by using the main network scheduler in data center 2, the network controller in data center 1, and the main network scheduler in data center 1, where the information includes: the tenant identifier, the network name, the ID of the virtual network, the ID of the virtual subnet, the subnet gateway IP address, and a DHCP IP address pool.

(21) The cross-data-center scheduler in data center 1 sends, to a computing resource scheduler in data center 2, a request for creating a virtual machine and adding the virtual machine to the virtual subnet, where the request for creating a virtual machine carries the virtual machine description parameter list of data center 2.

(22) The computing resource scheduler in data center 2 creates a virtual machine according to the virtual machine description parameter list of data center 2 and adds the virtual machine to the virtual subnet.

(23) The computing resource scheduler in data center 2 returns a virtual machine identifier to the cross-data-center scheduler in data center 1.

In the resource request processing process applied to a distributed data center system according to the embodiment of the present invention, data center 1 can use a resource in data center 2, so that infrastructure resources of all data centers become a unified "logical resource pool", which achieves global availability of resources and supports flexible scheduling of resources across physical data centers. By using the method applied to the distributed data center system according to the embodiment of the present invention, resource utilization of a data center is improved, administration, maintenance, and operation are simplified, and an occurrence probability of network connection faults or traffic congestion is reduced.

For the detailed process, refer to descriptions in the embodiment in FIG. 2 (FIG. 2 is separated into FIGS. 2A-2G).

FIG. 2 is a schematic flowchart when a resource provisioning method according to an embodiment of the present invention is applied to a specific scenario. In FIG. 2, there are three data centers, where data center 1 receives a resource request from a tenant. It should be noted that in actual application, any data center can receive a resource request from the tenant, and functions of all data centers are equivalent. As shown in FIG. 2, the specific resource provisioning process includes the following steps:

(1) A cross-data-center scheduler in data center 1 receives a resource request message, where parameters in the message include tenant identifier, resource template identifier, whether to designate a data center, designated data center identifier list, and cross-data-center resource allocation policy (such as even allocation of resources and proportion allocation by idle resource).

(2) After receiving the request message, the cross-data-center scheduler forwards the request message to an intelligent resource routing module in data center 1, requesting for parameter analysis.

(3) The intelligent resource routing module searches an image template library in data center 1 for specific parameter requirements of a resource that needs to be allocated in a resource template corresponding to the resource template identifier.

(4) The image template library returns, to the intelligent resource routing module, specific parameter requirements of the resource to be allocated:

virtual machine description parameter list: each item in the description parameter list includes a requirement for creating a virtual machine, including the number of allocated virtual machines, virtual machine specification identifier (through the virtual machine specification identifier, specification information of a virtual machine can be obtained, such as central processing unit (CPU) main frequency of the virtual machine, the number of CPUs, memory size, the number of disks, storage space of each disk, QoS level of disk access (used to select a disk storage type: solid state disk, directly-connected disk, external storage, and so on), backup mode of each disk, the number of virtual network adapters, and bandwidth of each virtual network adapter), virtual machine image link, physical computing resource or virtual computing resource, CPU type (for physical computing resources, a CPU type of a physical machine is designated), HyperVisor CPU type (if virtual computing resources are requested, a HyperVisor type is designated), whether to enable high availability (HA), whether to enable fault tolerance (FT), whether redundancy is required, redundancy type (synchronous redundancy, asynchronous redundancy, redundancy mode (dual-active, active/standby mode), virtual machine boot parameter, virtual machine configuration parameter, security group, and other parameters.

network resource specification parameters: network name, subnet name, subnet CIDR, subnet IP address version number, subnet gateway IP address, whether to enable DHCP to allocate an IP address, DHCP IP address pool, list of external network IP addresses, subnet QoS parameters (including network bandwidth lower limit, network bandwidth upper limit, network jitter upper limit, network jitter lower limit, network delay upper limit, network delay lower limit, upper limit of network packet loss rate, and lower limit of network packet loss rate), cross-data-center subnet division mode (mode 1: IP addresses are evenly divided, and a gateway is deployed in each data center; mode 2: single gateway, single IP address pool).

Parameters in the resource request message may include the virtual machine description parameter list and/or one or more types of parameters in network resource specification parameters. When the virtual machine description parameter list includes parameters related to redundancy (redundancy type and redundancy mode), generally, the subnet QoS parameters in network resource specification parameters are also included, so that network requirements for redundancy are determined.

(5) The intelligent resource routing module searches a distributed database in data center 1 according to the tenant identifier, to obtains a set of data center lists that can request resources, and if the "whether to designate data center" parameter is "Yes", calculates an intersection of the set and "a designated data center identifier list" to obtain a set of data center lists through preliminary analysis.

The intelligent resource routing module analyzes the destination data center list according to the virtual machine description parameter list and network resource specification parameters returned by the image template library, the set of data center lists obtained through preliminary analysis, and the cross-data-center resource allocation policy (such as even allocation of resources and proportion allocation by idle resource):

First, the intelligent resource routing template obtains a first data center list from the set of data center lists, and according to specific virtual machine requirements in the virtual machine description parameter list and the cross-data-center resource allocation policy, checks whether each data center in the list has computing resources and storage resources that meet the conditions. If there are sufficient computing resources and storage resources, the intelligent resource routing module checks whether there are network resource specification parameters. If there are network resource specification parameter requirements, the intelligent resource routing module analyzes whether a network between data centers and a network in a data center meet subnet QoS parameter requirements. According to the computing resource, storage resource, and network resource requirements, whether the virtual machine needs to be created in a specific host cluster during allocation can be analyzed. If the data centers in a data center list meet the parameter requirements of computing resources, storage resources, and networks between data centers, the data list is a data center list that meets requirements. If any parameter of the computing resource, storage resource, or network resource specification parameters does not meet requirements, the data center list is not a data center list that meets requirements.

The foregoing analysis on computing resources, storage resources, and network resources is repeated until all data center lists in the set of data center lists are analyzed, and data center list sets that meet requirements are sorted in a descending order by a fulfillment degree to obtain a destination data center list set that meets resource provisioning requirements. Each data center list in the destination data center list set includes the following information: {[network resource specification parameters], [data center identifier, virtual machine description parameter list]}, where the data center identifier and the virtual machine description parameter list are in an "and" relationship, and [network resource specification parameters] and [data center identifier, virtual machine description parameter list] are in an "and/or" relationship.

(6) The intelligent resource routing module returns the destination data center list set to the cross-data-center scheduler, where each list in the set includes the following information: {[network resource specification parameters], and [data center identifier, virtual machine description parameter list]}.

(7) The cross-data-center scheduler obtains a data center list from the foregoing destination data center list set and starts a resource provisioning transaction. The following step (8) to step (49) are a complete resource provisioning transaction. In the whole resource provisioning transaction, if one resource fails to be provisioned, the whole transaction rolls back, and all provisioned resources in the transaction are released.

(8) The cross-data-center scheduler in data center 1 checks information {[network resource specification parameters], [data center identifier, virtual machine description parameter list]} in the data center list. If network resource specification parameters are included, the cross-data-center scheduler determines whether a virtual network indicated by the network name under the tenant identifier exists, and if the virtual network does not exist, sends a request for creating a virtual network to the main network scheduler in the data center where the cross-data-center scheduler is located, where the parameters include tenant identifier and network name.

(9) The main network scheduler in data center 1 determines that the request is creating a virtual network, the main network scheduler sends a request for creating a virtual network to the network controller in the local data center.

(10) The network controller creates a virtual network for the tenant according to the tenant identifier and network name parameters, generates a unique network identifier, network ID, and initializes the network status to an activated state. The network controller writes the network ID, network name, tenant identifier, and network status of the newly created virtual network into the distributed database, and requests the distributed database to synchronize information about the virtual network to all data centers.

(11) The distributed database updates the information about the newly created virtual network, including the tenant identifier, network ID, and network status, to distributed databases in other data centers (data center 2 and data center 3 in FIG. 2).

(12) The distributed database returns a database update result to the network controller in data center 1.

(13) If the database is successfully updated, the network controller returns the information about the newly created virtual network to the main network scheduler, including the tenant identifier, network ID, network name, and network status. If the database is unsuccessfully updated, the network controller returns a virtual network creation failure to the main network scheduler.

(14) The main network scheduler returns the information about the newly created virtual network to the cross-data-center scheduler.

(15) The cross-data-center scheduler checks the information about the virtual network; and if the virtual network fails to be created, the process ends. If the information about the virtual network is successfully added to the database, the cross-data-center scheduler checks {[network resource specification parameters] and [data center identifier, virtual machine description parameter list]}, and determines, according to the tenant identifier, network name, and subnet name, whether a subnet indicated by the subnet name exists. If the subnet does not exist, the cross-data-center scheduler needs to create a subnet, and analyze parameters {[network resource specification parameters] and [data center identifier, virtual machine description parameter list]} to obtain a list of data centers for which a virtual subnet is to be created. When the number of data centers in the data center list is greater than 1, it indicates that a virtual subnet needs to be created for all data centers in the data center list; otherwise, a virtual subnet needs to be created only for the designated data center. If a virtual subnet is created only in the designated data center (data center 1 in FIG. 2), the cross-data-center scheduler sends a request for creating a virtual subnet to the main network scheduler in data center 1, where the request carries parameters tenant identifier, network ID, subnet name, subnet CIDR, subnet IP address version number, subnet gateway IP address, whether to enable DHCP to allocate an IP address, data center identifier list, and cross-data-center subnet division mode (mode 1: IP addresses are evenly divided, and a gateway is deployed in each data center; mode 2: IP addresses are evenly allocated, single gateway mode).

(16) The main network scheduler sends a request for creating a virtual subnet to the network controller in the data center where the main network scheduler is located, where the request carries parameters: tenant identifier, network ID, subnet name, subnet CIDR, subnet IP address version number, subnet gateway IP address, whether to enable DHCP to allocate an IP address, DHCP IP address pool, data center identifier list, and cross-data-center subnet division mode (mode 1: IP addresses are evenly divided, and a gateway is deployed in each data center; mode 2: single gateway, single IP address pool).

(17) The network controller creates a virtual subnet for the tenant according to the tenant identifier, network ID, and subnet name parameters, generates a unique subnet identifier, subnet ID, applies for a globally unique VxLAN ID, and sets subnet CIDR and subnet IP address version number in the parameters as subnet attributes. The network controller writes virtual subnet information, including tenant identifier, network ID, subnet name, subnet ID, VxLAN ID, subnet CIDR, and subnet IP address version number, into the distributed database in data center 1, and requests the distributed database to synchronize the virtual subnet information to all data centers.

(18) The distributed database in data center 1 updates the information about the newly created virtual subnet to distributed databases in other data centers (data center 2 and data center 3 in FIG. 2), including tenant identifier, network ID, subnet name, subnet ID, VxLAN ID, subnet CIDR, and subnet IP address version number.

(19) The distributed database in data center 1 returns a database update result to the network controller in the local data center.

(20) The network controller in data center 1 continues to analyze the data center identifier list of the virtual subnet and the cross-data-center subnet divide mode (mode 1: IP addresses are evenly divided, and a gateway is deployed in each data center; mode 2: single gateway, single IP address pool). If the data center identifier list has more than one data center identifiers, and DHCP is required to be enabled to allocate an IP address for the subnet, the network controller performs, according to the cross-data-center subnet division mode (mode 1: IP addresses are evenly divided, and a gateway is deployed in each data center; mode 2: single gateway, single IP address pool), IP address division and gateway IP address setting for the DHCP IP address pool to be allocated.

In mode 1, IP addresses are evenly divided, and different subnet gateway IP addresses are set. Assuming that CIDR is 192.168.0.0/24, IP address version number is IPV4, DHCP IP address pool is 192.168.0.1-192.168.0.254, and the data center identifier list includes data center 2 and data center 3, then, the DHCP IP address pool of the subnet in data center 2 is 192.168.0.2-192.168.0.127 and the gateway IP address is 192.168.0.1; the DHCP IP address pool of the subnet in data center 3 is 192.168.0.129-192.168.0.254 and the gateway IP address is 192.168.0.128. In mode 2, there is only a single gateway and a single IP address pool, and IP addresses are not divided, but a subnet gateway IP address is set for the first data center. Assuming that CIDR is 192.168.0.0/24, IP address version number is IPV4, DHCP IP address pool is 192.168.0.1-192.168.0.254, and the data center identifier list includes data center 2 and data center 3, then, the DHCP IP address pool of the subnet in data center 2 is 192.168.0.2-192.168.0.254 and the gateway IP address is 192.168.0.1; the DHCP IP address pool of the subnet in data center 3 is 192.168.0.2-192.168.0.254, whether to enable DHCP service is set to No, and gateway IP is an invalid IP address. A request for creating a virtual subnet is sent to the main network scheduler in each data center (data center 2 and data center 3 in FIG. 2) in the data center identifier list, where the request carries the following parameters: tenant identifier, network ID, subnet name, subnet ID, VxLAN ID, subnet CIDR, subnet IP address version number, whether to enable DHCP to allocate an IP address, subnet gateway IP address after division, and DHCP IP address pool after division.

If the data center identifier list includes only one data center identifier, DHCP IP address pool division and subnet gateway IP address resetting are not performed.

(21) The main network schedulers in data center 2 and data center 3 send a request for creating a virtual subnet to network controllers in respective data centers, where the request carries the following parameters: tenant identifier, network ID, subnet name, subnet ID, VxLAN ID, subnet CIDR, subnet IP address version number, whether to enable DHCP to allocate an IP address, subnet gateway IP address after division, and DHCP IP address pool after division.

It should be noted that the procedure for creating a virtual subnet in data center 2 is the same as that in data center 3; therefore, for ease of description, the following step (22) to step (28) are described by using only data center 2 as an example.

(22) The network controller in data center 2 determines that the virtual subnet indicated by a parameter in the request for creating a virtual subnet already exists, and there is no data center list, the network controller continues to create a virtual service gateway for the virtual subnet in the local data center. If the subnet gateway IP address is valid, it indicates that a gateway service needs to be requested. The network controller sends a gateway service request to a VSG manager in the local data center, where the parameters include subnet ID, whether to enable DHCP to allocate an IP address, DHCP IP address pool after division, VxLAN ID, and subnet gateway IP address after division.

(23) The VSG manager adds a gateway service and a DHCP service to a software service gateway managed by the VSG manager. The gateway service and DHCP service can be added in two ways:

Way 1: If a VSG virtual machine that already has a gateway service capability is capable of providing a VSG service (such as one or more services in the following services: Route service, DHCP Server service, VxLAN gateway service, NAT service, ACL service, VPN service, and software load balancing service) for a new virtual subnet, add a network adapter to the existing VSG virtual machine, set an IP address of the network adapter to the subnet gateway IP address in the parameters in the request for creating a virtual subnet, enable a DHCP service, and configure the DHCP IP address pool after division.

Way 2: Create a new VSG virtual machine, add two network adapters in the newly created VSG virtual machine, enable a DHCP service, and configure the DHCP IP address pool after division, where one network adapter is used to connect to an external network to obtain an IP address from the external network or the IP address of the network adapter is configured to a fixed IP address; and, the other network adapter is used to connect to a virtual subnet, and an IP address of the network adapter is configured to the subnet gateway IP address in the parameters in the request for creating a virtual subnet.

The VSG manager creates a mapping relationship between a virtual subnet ID and a newly added VSG virtual machine, a gateway service, and a network adapter. The VSG manager returns a gateway service request result to the network controller in the local data center, where the result includes the VSG virtual machine identifier and the MAC address of the newly added network adapter.

(24) The network controller receives a gateway service message returned by the VSG manager and determines whether the returned VSG virtual machine has been added to the virtual subnet. If the VSG virtual machine is not added to the virtual subnet, the network controller creates a port on the virtual subnet: the network controller issues a command for binding the VSG virtual machine to the virtual subnet to the host where the VSG virtual machine is located, where the carried parameters include tenant identifier, virtual network ID, virtual subnet ID, MAC address of the VSG virtual machine, port status is the activated state, gateway IP address, and VSG virtual machine identifier. A network controller agent is deployed on a host where the VSG virtual machine is located. The network controller agent, upon receiving the command, is responsible for managing a virtual switch (vSwitch) on the host, applying for a port on the vSwitch, binding an MAC address of the VSG virtual machine, adding an identifier of the virtual subnet VxLAN, and allocating a unique port identifier to the port, namely, port ID. After the virtual machine is successfully bound, the network controller writes port information into the local database.

(25) The network controller checks the parameter: whether to enable DHCP service. If the DHCP service needs to be requested, the network controller sends a DHCP service request to the VSG manager in the local data center, where the parameters include the subnet ID and the DHCP IP address pool after division.

(26) The VSG manager obtains the VSG virtual machine corresponding to the subnet according to the subnet ID. If no VSG virtual machine can be obtained, it indicates that a VSG virtual machine needs to be allocated for the virtual subnet to provide the DHCP service. The VSG virtual machine can be requested in the following two ways:

Way 1: If an existing VSG virtual machine is capable of providing a VSG service (such as one or more services in the following services: Route service, DHCP Server service, VxLAN gateway service, NAT service, ACL service, VPN service, and software load balancing service) for a new virtual subnet, add a network adapter to the existing VSG virtual machine, and set the IP address of the network adapter to the first IP address in the IP address pool.

Way 2: Create a new VSG virtual machine, add a network adapter that is used to connect to a virtual subnet for the virtual machine, and configure the IP address of the network adapter to the first IP address in the IP address pool.

Start a DHCP service in the VSG virtual machine, set the IP address that can be allocated to the DHCP service to the DHCP IP address pool after division, bind the gateway IP address of the virtual subnet to the DHCP service, and provide the DHCP service for the virtual subnet. The VSG manager starts the DHCP service. The VSG manager returns a DHCP service request result to the network controller, where the result includes the VSG virtual machine identifier and the MAC address of the newly added network adapter.

(27) The network controller receives the result, determines whether the VSG virtual machine has been added to the virtual subnet, and if the virtual machine is not added to the virtual subnet, performs the operation of adding the VSG virtual machine to the virtual subnet in step (24). Then, the network controller returns information about the virtual network to the main network scheduler in the local data center.

(28) The main network scheduler returns the information about the virtual network to the network controller in data center 1.

Similarly, for data center 3, after the foregoing step (22) to step (27) are performed, the main network scheduler in data center 3 also returns a virtual subnet creation result to the network controller in data center 1.

(29) The network controller in data center 1 returns the information about the virtual network to the main network scheduler in data center 1.

(30) The main network scheduler in data center 1 returns the information about the virtual subnet to the cross-data-center scheduler in data center 1, including: tenant identifier, network ID, subnet name, subnet ID, subnet CIDR, subnet IP address version number, subnet gateway IP address, whether to enable DHCP to allocate an IP address, IP address pool, VxLAN ID, and cross-data-center subnet division mode.

(31) The cross-data-center scheduler in data center 1 checks the virtual machine information {[network resource specification parameters] and [data center identifier, virtual machine description parameter list]} in the data center list, and delivers a virtual machine creation task to each data center for which a virtual machine needs to be created. These tasks are delivered concurrently. When multiple virtual machines of different specifications need to be created, the cross-data-center scheduler separately delivers multiple virtual machine creation tasks. When virtual machines of the same specification need to be created in batches, a batch creation interface is called, carrying the number of virtual machines that need to be created. FIG. 2 shows an example of delivering a task for creating a single virtual machine to computing resource schedulers in data center 2 and data center 3, where the carried parameters include: virtual machine specification identifier (through the virtual machine specification identifier, specification information of a virtual machine can be obtained, such as CPU main frequency of the virtual machine, the number of CPUs, memory size, the number of disks, storage space of each disk, QoS level of disk access (used to select a disk storage type: solid state disk, directly-connected disk, external storage, and so on), backup mode of each disk, the number of virtual network adapters, and bandwidth of each virtual network adapter), virtual machine image link, physical computing resource or virtual computing resource, CPU type (for physical computing resources, a CPU type of a physical machine is designated), HyperVisor CPU type (if virtual computing resources are requested, a HyperVisor type is designated), whether to enable HA, whether to enable FT, whether redundancy is required, redundancy type (synchronous redundancy, asynchronous redundancy), redundancy mode (dual-active, active/standby mode), virtual machine boot parameter, virtual machine configuration parameter, security group, designated host cluster, to-be-added virtual subnet identifier list, and other parameters.

It should be noted that the procedures for creating a virtual machine and adding the virtual machine to a virtual subnet in data center 2 is the same as those in data center 3; therefore, for ease of description, the following step (32) to step (49) are described by using only data center 2 as an example.

(32) A computing resource scheduler in data center 2 creates a virtual machine logical object, creates a unique identifier for the virtual machine, and records virtual machine information.

(33) The computing resource scheduler writes the virtual machine information into a distributed database in data center 2, without the need to synchronize the information to another data center.

(34) The distributed database returns a database update result to the computing resource scheduler.

(35) The computing resource scheduler returns the virtual machine identifier to a cross-data-center scheduler in data center 1.

(36) The cross-data-center scheduler in data center 1 polls the creation status of the virtual machine from the computing resource scheduler in data center 2, where the carried parameter is the virtual machine identifier, and ends the virtual machine creation task after the virtual machine is created successfully.

It should be noted that the cross-data-center scheduler can periodically poll the creation status of the virtual machine from the computing resource schedulers in data centers 2 and 3 until this resource provisioning transaction ends.

(37) The computing resource scheduler in data center 2 schedules computing resources: obtain virtual machine specifications according to a virtual machine specification identifier, including CPU main frequency of the virtual machine, the number of CPUs, memory size, the number of disks, and storage size of each disk; determine the resource conditions for creating a virtual machine, including QoS level of disk access, physical computing resource or virtual computing resource, CPU type (for physical computing resources, a CPU type of a physical machine is designated), and HyperVisor CPU type (if virtual computing resources are requested, a HyperVisor type is designated); and, select a host that meets all the conditions. If a host cluster is designated in the parameters, the computing resource scheduler selects a host from the designated host cluster. On the selected host, an image is obtained from an image template library in data center 2 according to an image link parameter, and a virtual machine is created.

The virtual machine starts and configures the virtual machine according to the virtual machine boot parameter and virtual machine configuration parameter.

(38) The computing resource scheduler in data center 2 obtains virtual subnet IDs one by one from the to-be-added virtual subnet identifier list, and sends a request for creating a port to a main network scheduler in a local data center, where the request carries the following parameters: network ID, subnet ID, virtual machine identifier, MAC address of the virtual machine network adapter to be added to the virtual subnet, and port initial status (activated state).

(39) The main network scheduler forwards the request for creating a port to the network controller in data center 2.

(40) The network controller obtains information about the virtual subnet according to the subnet ID, where the information includes tenant identifier, network ID, subnet name, subnet ID, VxLAN ID, subnet CIDR, and subnet IP address version number. Then, the network controller issues a command for binding the virtual machine to the virtual subnet to the host where the virtual machine is located, where the carried parameters include tenant identifier, network ID, subnet ID, virtual machine identifier, MAC address of virtual machine, and port status. A network agent is deployed on the host where the virtual machine is located. The network agent, upon receiving the command, is responsible for managing a vSwitch on the host, applying for a port on the vSwitch, binding an MAC address of the virtual machine, adding an identifier of the virtual subnet VxLAN, and after the virtual machine is added to a layer 2 network of the VxLAN, obtaining an IP address from a DHCP server of the virtual subnet. The network controller allocates a unique port identifier, namely, port ID, to the port. After the virtual machine is successfully bound, the network controller writes port information into a database. The network controller returns port information to the main network scheduler in the local data center, where the port information includes port ID, tenant identifier, network ID, subnet ID, virtual machine identifier, MAC address of virtual machine, virtual machine IP address, and port status.

(41) The main network scheduler returns the information about the port added by the virtual machine to the virtual subnet to the computing resource scheduler in the local data center, where the port information includes port ID, tenant identifier, network ID, subnet ID, virtual machine identifier, MAC address of virtual machine, virtual machine IP address, and port status.

(42) The computing resource scheduler obtains the information about the port added by the virtual machine to the virtual subnet, determines that the virtual machine is successfully added to the virtual subnet, and then writes a mapping relationship between the virtual machine ID (i.e., virtual machine identifier) and the port ID (i.e., port identifier) into the distributed database in data center 2, and synchronizes the mapping relationship to another data center.

(43) The distributed database in data center 2 returns a database update result to the computing resource scheduler in the local data center.

(44) The computing resource scheduler sends a request for creating a storage resource to a storage resource scheduler in data center 2 according to the number of disks, storage size of each disk, and QoS level of disk access, where the request carries the following parameters: virtual machine identifier, storage size, QoS level of disk access, and host cluster where the virtual machine is located.

(45) The storage resource scheduler selects a specific disk storage type, such as solid state disk, directly-connected disk, or external storage, according to the following parameters: virtual machine identifier, storage size, QoS level of disk access, and host cluster where the virtual machine is located. The storage resource scheduler creates a volume meeting the QoS level of disk access and storage size on the selected disk, generates a unique volume identifier, namely volume ID, and returns the volume identifier to the computing resource scheduler.

(46) The computing resource scheduler attaches the volume to a virtual machine represented by the virtual machine identifier, creates an association between the volume identifier and the virtual machine, and generates a unique association identifier.

(47) If the volume is successfully attached, the computing resource scheduler writes the virtual machine ID, volume identifier, and association identifier into the distributed database in data center 2, and synchronizes the information to another data center.

(48) The distributed database returns a database update result to the computing resource scheduler. If another volume needs to be created, repeat steps (45) to (47) until all volumes are created and attached successfully.

(49) After the cross-data-center scheduler in data center 1 learns, by polling an execution result of the virtual machine creation task, that data centers 2 and 3 complete the foregoing resource provisioning transaction, the cross-data-center scheduler in data center 1 ends the resource provisioning transaction in the first data center list, or if a resource request fails in any step in the transaction, releases all allocated resources in the transaction. Then, the cross-data-center scheduler selects a suboptimal data center list in the set of data center lists, and repeats the resource provisioning transaction, where the number of repetitions is subject to system configuration.

(50) The cross-data-center scheduler in data center 1 returns a resource provisioning result, and if the result is success, returns the provisioned computing resource, storage resource, and network resource.

The resource provisioning method according to embodiments of the present invention, through interaction between distributed cloud operating systems deployed in all data centers, performs corresponding resource provisioning steps to make infrastructure resources of all data centers become a unified "logical resource pool", which achieves global availability of resources and supports flexible scheduling of resources across physical data centers. In this way, the resource utilization of a data center is improved, administration, maintenance, and operation are simplified, and an occurrence probability of network connection fault or traffic congestion is reduced.

It should be understood that in embodiments of the present invention, "B corresponding to A" means that B is associated with A, and B can be determined according to A. It should also be understood that, determining B according to A does not mean that B is determined merely according to A, and B may be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on the particular applications and design constraint conditions of the technical solution. A person skilled in the art may use different methods to implement the described functions for each particular application, but it should not be considered that the implementation goes beyond the scope of the embodiments of the present invention.

In the embodiment provided in the present application, it should be understood that the disclosed system may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. Some or all of the units may be selected to achieve the objective of the solution of the embodiment of the present invention according to actual needs.

In addition, functional units in the embodiments of the present invention may be integrated into one processing unit, or each of the units may exist alone physically, or two or more units may be integrated into one unit. The integrated units may be implemented in a form of hardware, or may be implemented in a form of a software functional unit.

When the integrated units are implemented in a form of a software functional unit and sold or used as an independent product, the integrated units may be stored in a computer-readable storage medium. Based on such an understanding, the technical solutions of the embodiments of the present invention essentially, or the part contributing to the prior art, or all or a part of the technical solutions may be implemented in a form of a software product. The computer software product is stored in a storage medium and includes several instructions for instructing a computer device (which may be a personal computer, a server, or a network device) to perform all or a part of the steps of the methods described in the embodiments of the present invention. The foregoing storage medium includes: any mediums that can store program code, such as a USB flash drive, a removable hard disk, a read-only memory (ROM), a random access memory (RAM), a magnetic disc, or an optical disc.

The foregoing descriptions are merely specific embodiments of the present invention, but are not intended to limit the protection scope of the present invention. Any equivalent modification or replacement readily figured out by a person skilled in the art within the technical scope of the present invention shall fall within the protection scope of the present invention. Therefore, the protection scope of the present invention shall be subject to the protection scope of the claims.

What is claimed is:

1. A resource provisioning method applied to a distributed data center system with at least two data centers, the method comprising:

receiving, by a first data center, a resource request message, wherein the first data center is any data center that receives the resource request message in the distributed data center system, and the resource request message comprises a tenant identifier and a resource template identifier;

obtaining, by the first data center, resource template information according to the tenant identifier and the resource template identifier, wherein the resource template information includes a network resource specification parameter;

obtaining, by the first data center, a destination data center list according to the resource template information and the tenant identifier, wherein the destination data center list comprises the first data center and a second data center;

creating, by the first data center, a virtual network according to the tenant identifier and a network name in the network resource specification parameter, wherein creating the virtual network comprises:

1) determining, by the first data center through analyzing the resource template information, one or more destination data center for which a virtual subnet needs to be created, wherein the one or more destination data center includes the first data center;

2) creating, by the first data center, the virtual subnet according to the tenant identifier, the identifier of the virtual network, and a subnet name in the network resource specification parameter; and 3) synchronizing, by the first data center, information about the virtual subnet to the second data center in the destination data center list, wherein the information includes the tenant identifier, the subnet name, and identifiers of the virtual network and the virtual subnet;

sending, by the first data center, a request to the second data center for creating a virtual machine and adding the virtual machine to the virtual network, wherein the request includes a virtual machine specification identifier indicating one or more virtual machine specification; and receiving, by the first data center, an identifier (ID) of the virtual machine from the second data center.

2. The resource provisioning method according to claim 1, further comprising: synchronizing, by the first data center, information about the virtual network to the second data center, wherein the information about the virtual network includes the tenant identifier, the network name, and an identifier of the virtual network.

3. The resource provisioning method according to claim 1, wherein the one or more destination data center comprises the second data center, and the method further comprises:

obtaining, by the first data center, a Dynamic Host Configuration Protocol (DHCP) IP address pool and a subnet gateway IP address for the second data center by performing DHCP IP address pool division and gateway IP address setting according to a cross-data-center subnet division mode in the destination data center list; and sending, by the first data center, a request for creating a virtual subnet to the second data center, wherein the request includes the tenant identifier, the identifier of the virtual network, the subnet name, the identifier of the virtual subnet, and, the DHCP IP address pool and the subnet gateway IP address for the second data center.

4. The resource provisioning method according to claim 3, wherein the method further comprises:

determining, by the second data center, that the virtual subnet indicated in the request already exists, and creating a virtual service gateway (VSG) in the second data center.

5. The resource provisioning method according to claim 4, wherein the creating the VSG in the second data center comprises:

adding, by a VSG manager in the second data center, a gateway service and a DHCP service to a software service gateway managed by the VSG manager based on the identifier of the virtual subnet indicated in the request, and, the DHCP IP address pool and the subnet gateway IP address for the second data center.

6. The resource provisioning method according to claim 5, wherein the adding the gateway service and the DHCP service comprises:

when a VSG virtual machine that already has a gateway service capability is capable of providing a VSG service for a new virtual subnet, adding a network adapter to the VSG virtual machine, setting an internet protocol (IP) address of the network adapter to the subnet gateway IP address for the second data center, enabling the DHCP service, and configuring an IP address of the DHCP service to the DHCP IP address pool for the second data center.

7. The resource provisioning method according to claim 6, further comprising:

determining, by the second data center, whether the VSG virtual machine has been added to the virtual subnet indicated by the request and when the VSG virtual machine is not added to the virtual subnet indicated by the request creating a port on the virtual subnet indicated by the request and binding the VSG virtual machine to the port.

8. The resource provisioning method according to claim 5, wherein the adding the gateway service and the DHCP service comprises:

creating a new VSG virtual machine, adding a first network adapter and a second network adapter in the created VSG virtual machine, enabling the DHCP service, and configuring the DHCP IP address pool for the second data center; wherein: the first network adapter is used to connect to an external network to obtain an IP address from the external network or the IP address of the first network adapter is configured to a fixed IP address; the second network adapter is used to connect to a virtual subnet; and an IP address of the second network adapter is configured to the subnet gateway IP address for the second data center, which is carried in the request for creating the virtual subnet.

9. The resource provisioning method according to claim 5, wherein the method further comprises:

when a VSG virtual machine that already has a gateway service capability is capable of providing a VSG service for a new virtual subnet, adding, by the VSG manager in the second data center, a network adapter to the VSG virtual machine, and setting an internet protocol (IP) address of the network adapter to a first IP address in the subnet gateway IP address for the second data center.

10. The resource provisioning method according to claim 9, wherein the method further comprises:

enabling a DHCP service, configuring an IP address of the DHCP service to the DHCP IP address pool for the second data center, and binding the DHCP service with the subnet gateway IP address for the second data center.

11. The resource provisioning method according to claim 5, wherein the method further comprises:

creating, by the VSG manager in the second data center, a new VSG virtual machine, adding a network adapter, wherein the network adapter is used to connect to the virtual subnet; and configuring, by the VSG manager in the second data center, an internet protocol (IP) address of the network adapter to a first IP address in the subnet gateway IP address for the second data center.

12. The resource provisioning method according to claim 1, further comprising:

receiving, by the second data center, the request from the first data center;

obtaining, by the second data center, the one or more virtual machine specifications based on the virtual machine specification identifier;

identifying, by the second data center, a host to create the virtual machine based on the one or more virtual machine specifications; and creating, by the second data center, the virtual machine on the host.

13. The resource provisioning method according to claim 12, wherein the method further comprises:

adding, by the second data center, the virtual machine to the virtual network.

14. The resource provisioning method according to claim 13, wherein the adding the virtual machine to the virtual network comprises:

obtaining, by the second data center, information about the virtual subnet according to a subnet ID carried in a request for creating a port, wherein the information about the virtual subnet includes the tenant identifier, the network name, and an identifier of the virtual network;

creating a port for the virtual machine on the virtual subnet according to the information about the virtual subnet; and binding the virtual machine to the port.

15. The resource provisioning method according to claim 14, further comprising:

synchronizing, by the second data center, a mapping relationship between the ID of the virtual machine and an ID of the port to the first data center.

16. The resource provisioning method according to claim 12, further comprising:

selecting, by the second data center, a storage resource, and creating a storage volume meeting a Quality of Service (QoS) level of disk access and a storage size on the selected storage resource;

attaching, by the second data center, the storage volume to the virtual machine;

creating an association between an ID of the storage volume and the ID of the virtual machine, and generating an association identifier; and synchronizing the ID of the virtual machine, the ID of the storage volume, and the association identifier to the first data center.

17. The resource provisioning method according to claim 1, wherein when the resource request message comprises a cross-data-center resource allocation policy, the method further comprises:

analyzing at least two destination data centers according to the cross-data-center resource allocation policy; and obtaining a destination data center that complies with the cross-data-center resource allocation policy.

18. A first data center in a distributed data center system, the first data center comprising:

a non-transitory, processor readable storage medium storing executable instructions; and a processor connected to the storage medium for executing the instructions that cause the processor to:

1) receive a resource request message and obtain a resource parameter of a second data center according to the resource request message wherein the resource parameter of the second data center comprises a virtual machine description parameter list, a network resource specification parameter, a tenant identifier, and a resource template identifier;

2) obtain, by the first data center, resource template information according to the virtual machine description parameter list, network specification parameter, tenant identifier, and the resource template identifier, wherein the resource template information includes a network resource specification parameter;

3) obtain, by the first data center, a destination data center list according to the resource template information and the tenant identifier, wherein the destination data center list comprises the first data center and a second data center;

4) create a virtual network according to the tenant identifier and a network name in the network resource specification parameter by:

a) determining one or more destination data centers for which a virtual subnet needs to be created, wherein the one or more destination data center includes the first data center, b) creating the virtual subnet according to the tenant identifier, an identifier of the virtual network, and a subnet name in the network resource specification parameter, and c) synchronizing information about the virtual subnet to the second data center in a destination data center list, wherein the information includes the tenant identifier, the subnet name, and identifiers of the virtual network and the virtual subnet;

5) send a create request message to the second data center for creating a virtual machine according to the resource template information, and add the virtual machine to the virtual subnet; and 6) receive an identifier (ID) of the virtual machine from the second data center.

19. The system according to claim 18, wherein:

the first data center is further configured to:

obtain a set of data center lists associated with the tenant identifier; and obtain the resource parameter of the second data center according to the resource request message by:

selecting a destination data center list according to the set of data center lists and the resource parameter associated with the resource template identifier; and obtaining a resource parameter of each destination data center in the destination data center list, wherein the destination data center list comprises the second data center, and the resource parameters of the destination data centers in the destination data center list comprise the resource parameter of the second data center.

20. The system according to claim 18, wherein that the first data center is further configured to:

send a request for creating the virtual subnet to the second data center, wherein the request for creating the virtual subnet carries the network resource specification parameter of the second data center; and send a request for creating a virtual machine to the second data center, wherein the request for creating the virtual machine carries the virtual machine description parameter list of the second data center.

21. The system according to claim 18, wherein:

the first data center is further configured to perform, according to a data center identifier list of the virtual subnet and a cross-data-center subnet division mode, internet protocol (IP) address pool division dividing to obtain an IP address pool and subnet gateway IP address setting to obtain a subnet gateway IP address for the second data center, wherein the network resource specification parameter of the second data center comprises the subnet gateway IP address and the IP address pool; and the second data center is configured to create a virtual service gateway in the second data center according to the subnet gateway IP address and the IP address pool.

22. The system according to claim 21, wherein the second data center comprises:

a virtual service gateway (VSG) manager configured to add, according to the subnet gateway IP address and the IP address pool, a gateway service and a Dynamic Host Configuration Protocol (DHCP) service to a software service gateway managed by the VSG manager.

23. The system according to claim 22, wherein that the VSG manager is configured to add, according to the subnet gateway IP address and the IP address pool, the gateway service and the DHCP service to the software service gateway managed by the VSG manager comprises one of the following:

when a VSG virtual machine that already has a gateway service capability is capable of providing a VSG service for the virtual subnet, a network adapter is added to the VSG virtual machine, an IP address of the network adapter is set to the subnet gateway IP address, the DHCP service is enabled, and the IP address pool is configured; and create a VSG virtual machine, add a network adapter to the VSG virtual machine, enable the DHCP service, and configure the IP address pool, wherein the network adapter is used to connect to the virtual subnet, and an IP address of the network adapter is configured to the subnet gateway IP address.

24. The system according to claim 18, wherein the first data center is further configured to:

select a storage resource;

create a storage volume meeting a Quality of Service (QoS) level of disk access and a storage size on the selected storage resource;

attach the storage volume to a virtual machine associated with a virtual machine identifier;

create an association between the volume identifier and the virtual machine identifier;

generate an association identifier; and synchronize the virtual machine identifier, the volume identifier, and the association identifier to another destination data center.

25. The system according to claim 18, wherein the second data center is configured to:

obtain information about the virtual subnet according to a subnet ID carried in a request for creating a port;

create a port for the virtual machine on the virtual subnet according to the information about the virtual subnet; and bind the virtual machine to the port.

* * * * *